United States Patent
Mercx et al.

(10) Patent No.: US 10,676,600 B2
(45) Date of Patent: Jun. 9, 2020

(54) GRAPHITE-BASED COMPOSITIONS WITH INCREASED VOLUME RESISTIVITY

(71) Applicant: SABIC GLOBAL TECHNOLOGIES B.V., Bergen op Zoom (NL)

(72) Inventors: Franciscus Petrus Maria Mercx, Halsteren (NL); Fabian Darosa, Dordrecht (NL)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 16/497,100

(22) PCT Filed: Mar. 29, 2018

(86) PCT No.: PCT/IB2018/052216
§ 371 (c)(1),
(2) Date: Sep. 24, 2019

(87) PCT Pub. No.: WO2018/178940
PCT Pub. Date: Oct. 4, 2018

(65) Prior Publication Data
US 2020/0032038 A1 Jan. 30, 2020

(30) Foreign Application Priority Data

Mar. 30, 2017 (EP) .................................... 17305383

(51) Int. Cl.
*C08L 23/06* (2006.01)
*C08L 23/12* (2006.01)
(Continued)

(52) U.S. Cl.
CPC ............... *C08L 23/06* (2013.01); *C08J 7/123* (2013.01); *C08J 9/0014* (2013.01); *C08K 3/04* (2013.01);
(Continued)

(58) Field of Classification Search
CPC .......... C08L 23/06; C08L 23/12; C08L 33/00; C08L 2203/20; C08L 2207/062;
(Continued)

(56) References Cited

U.S. PATENT DOCUMENTS

2012/0270960 A1* 10/2012 Felisari ................. B82Y 30/00
521/90

FOREIGN PATENT DOCUMENTS

KR 2016-0063537 A 6/2019
TW 201604272 A 2/2016
(Continued)

*Primary Examiner* — William K Cheung
(74) *Attorney, Agent, or Firm* — BakerHostetler

(57) ABSTRACT

A blended thermoplastic composition includes: from about 20 wt % to about 99 wt % of a thermoplastic polymer element; from about 1 wt % to about 60 wt % of a graphite-based filler element including at least about 0.01 wt % functional groups on a surface of the graphite-based filler element; from about 0.1 wt % to about 30 wt % of a functional agent element; and from about 0 to about 50 wt % of a thermally conductive and electrically insulative filler. The functional agent element includes functional groups that interact with the functional groups on the surface of the graphite-based filler element, resulting in an increase of the volume resistivity of the blended thermoplastic composition that is at least $1*10^2$ greater than the volume resistivity of a substantially identical electrically conductive blended thermoplastic composition that does not include a functional agent element.

20 Claims, 15 Drawing Sheets

Table 1A

| Sample No. | KS6 experiments |||||| 
|---|---|---|---|---|---|---|
| | C1.1 | C2.1 | C3.1 | Ex1.1 | Ex2.1 | Ex3.1 |
| PP595A (powder) (wt%) | 78.4 | 61.7 | 48.4 | 68.4 | 51.8 | 38.6 |
| Lotader AX8900 (wt%) | - | - | - | 10.0 | 10.0 | 10.0 |
| Imerys KS6 (wt%) | 21.6 | 38.3 | 51.6 | 21.6 | 38.2 | 51.4 |
| Total (wt%) | 100 | 100 | 100 | 100 | 100 | 100 |
| Vol % graphite loading | 10 | 20 | 30 | 10 | 20 | 30 |
| Through-plane TC (W/mK) | 0.268 | 0.376 | 0.530 | 0.317 | 0.451 | 0.712 |
| In-plane TC (W/mK) | 1.111 | 3.007 | 6.068 | 1.169 | 3.007 | 6.142 |
| Bulk TC* (W/mK) | 0.546 | 1.063 | 1.793 | 0.609 | 1.164 | 2.091 |
| Volume resist. (Ohm-cm) | 3.75E+05 | 2.80E+01 | 3.36E+00 | 2.76E+09 | 1.91E+06 | 1.14E+05 |

Table 1B

| Sample No. | KS25 experiments |||||| 
|---|---|---|---|---|---|---|
| | C4.1 | C5.1 | C6.1 | Ex4.1 | Ex5.1 | Ex6.1 |
| PP595A (powder) (wt%) | 78.4 | 61.7 | 48.4 | 68.4 | 51.8 | 38.6 |
| Lotader AX8900 (wt%) | - | - | - | 10.0 | 10.0 | 10.0 |
| Imerys KS25 (wt%) | 21.6 | 38.3 | 51.6 | 21.6 | 38.2 | 51.4 |
| Total (wt%) | 100 | 100 | 100 | 100 | 100 | 100 |
| Vol % graphite loading | 10 | 20 | 30 | 10 | 20 | 30 |
| Through-plane TC (W/mK) | 0.292 | 0.445 | 0.632 | 0.292 | 0.426 | 0.749 |
| In-plane TC (W/mK) | 1.221 | 3.218 | 6.210 | 1.292 | 3.350 | 6.312 |
| Bulk TC* (W/mK) | 0.597 | 1.197 | 1.981 | 0.615 | 1.195 | 2.174 |
| Volume resist. (Ohm-cm) | 1.27E+07 | 1.06E+02 | 6.92E+00 | 6.19E+09 | 7.39E+05 | 4.34E+03 |

(51) Int. Cl.
*C08L 33/00* (2006.01)
*C08K 3/04* (2006.01)
*C08J 9/14* (2006.01)
*C08K 5/1539* (2006.01)
*C08J 7/12* (2006.01)
*C08J 9/00* (2006.01)
C08K 3/38 (2006.01)
C08K 3/22 (2006.01)
C08K 3/26 (2006.01)

(52) U.S. Cl.
CPC ............ *C08K 5/1539* (2013.01); *C08L 23/12* (2013.01); *C08L 33/00* (2013.01); *C08K 2003/222* (2013.01); *C08K 2003/2224* (2013.01); *C08K 2003/265* (2013.01); *C08K 2003/385* (2013.01); *C08L 2203/20* (2013.01); *C08L 2207/062* (2013.01)

(58) Field of Classification Search
CPC ........... C08J 7/123; C08J 9/0014; C08K 3/04; C08K 5/1539; C08K 2003/222; C08K 2003/2224; C08K 2003/265; C08K 2003/385
USPC ........................................................ 524/495
See application file for complete search history.

(56) References Cited

FOREIGN PATENT DOCUMENTS

WO    WO 2015/157941 A1    10/2015
WO    WO 2017/005736 A1    1/2017

* cited by examiner

Table 1A

KS6 experiments

| Sample No. | C1.1 | C2.1 | C3.1 | Ex1.1 | Ex2.1 | Ex3.1 |
|---|---|---|---|---|---|---|
| PP595A (powder) (wt%) | 78.4 | 61.7 | 48.4 | 68.4 | 51.8 | 38.6 |
| Lotader AX8900 (wt%) | - | - | - | 10.0 | 10.0 | 10.0 |
| Imerys KS6 (wt%) | 21.6 | 38.3 | 51.6 | 21.6 | 38.2 | 51.4 |
| Total (wt%) | 100 | 100 | 100 | 100 | 100 | 100 |
| Vol % graphite loading | 10 | 20 | 30 | 10 | 20 | 30 |
| Through-plane TC (W/mK) | 0.268 | 0.376 | 0.530 | 0.317 | 0.451 | 0.712 |
| In-plane TC (W/mK) | 1.111 | 3.007 | 6.068 | 1.169 | 3.007 | 6.142 |
| Bulk TC* (W/mK) | 0.546 | 1.063 | 1.793 | 0.609 | 1.164 | 2.091 |
| Volume resist. (Ohm-cm) | 3.75E+05 | 2.80E+01 | 3.36E+00 | 2.76E+09 | 1.91E+06 | 1.14E+05 |

FIG. 1A

Table 1B

KS25 experiments

| Sample No. | C4.1 | C5.1 | C6.1 | Ex4.1 | Ex5.1 | Ex6.1 |
|---|---|---|---|---|---|---|
| PP595A (powder) (wt%) | 78.4 | 61.7 | 48.4 | 68.4 | 51.8 | 38.6 |
| Lotader AX8900 (wt%) | - | - | - | 10.0 | 10.0 | 10.0 |
| Imerys KS25 (wt%) | 21.6 | 38.3 | 51.6 | 21.6 | 38.2 | 51.4 |
| Total (wt%) | 100 | 100 | 100 | 100 | 100 | 100 |
| Vol % graphite loading | 10 | 20 | 30 | 10 | 20 | 30 |
| Through-plane TC (W/mK) | 0.292 | 0.445 | 0.632 | 0.292 | 0.426 | 0.749 |
| In-plane TC (W/mK) | 1.221 | 3.218 | 6.210 | 1.292 | 3.350 | 6.312 |
| Bulk TC* (W/mK) | 0.597 | 1.197 | 1.981 | 0.615 | 1.195 | 2.174 |
| Volume resist. (Ohm-cm) | 1.27E+07 | 1.06E+02 | 6.92E+00 | 6.19E+09 | 7.39E+05 | 4.34E+03 |

FIG. 1B

Table 1C

| Sample No. | KS150 experiments | | | | | |
|---|---|---|---|---|---|---|
| | C7.1 | C8.1 | C9.1 | Ex7.1 | Ex8.1 | Ex9.1 |
| PP595A (powder) (wt%) | 78.4 | 61.7 | 48.4 | 68.4 | 51.8 | 38.6 |
| Lotader AX8900 (wt%) | - | - | - | 10.0 | 10.0 | 10.0 |
| Imerys KS5150 (wt%) | 21.6 | 38.3 | 51.6 | 21.6 | 38.2 | 51.4 |
| Total (wt%) | 100 | 100 | 100 | 100 | 100 | 100 |
| Vol % graphite loading | 10 | 20 | 30 | 10 | 20 | 30 |
| Through-plane TC (W/mK) | 0.309 | 0.507 | 0.830 | 0.344 | 0.536 | 0.840 |
| In-plane TC (W/mK) | 1.194 | 2.679 | 4.699 | 1.083 | 2.407 | 4.796 |
| Bulk TC* (W/mK) | 0.607 | 1.166 | 1.975 | 0.610 | 1.136 | 2.007 |
| Volume resist. (Ohm-cm) | 4.53E+09 | 3.72E+02 | 2.50E+01 | 3.49E+09 | 2.11E+05 | 4.69E+02 |

FIG. 1C

Table 1D

| Sample No. | C Therm 001 experiments | | | | | |
|---|---|---|---|---|---|---|
| | C10.1 | C11.1 | C12.1 | Ex10.1 | Ex11.1 | Ex12.1 |
| PP-595A (powder) (wt%) | 78.4 | 61.7 | 48.4 | 68.4 | 51.8 | 38.6 |
| Lotader AX8900 (wt%) | -- | -- | -- | 10.0 | 10.0 | 10.0 |
| Imerys C-Therm 001 (wt%) | 21.7 | 38.3 | 51.6 | 21.6 | 38.2 | 51.4 |
| Total (wt%) | 100.0 | 100.0 | 100.0 | 100.0 | 100.0 | 100.0 |
| Vol % graphite loading | 10 | 20 | 30 | 10 | 20 | 30 |
| Through-plane TC (W/mK) | 0.55 | 0.65 | 0.87 | 0.41 | 0.51 | 1.46 |
| In-plane TC (W/mK) | 3.39 | 7.64 | 13.55 | 4.00 | 10.06 | 12.00 |
| Bulk TC* (W/mK) | 1.37 | 2.22 | 3.43 | 1.28 | 2.26 | 4.19 |
| Volume resist. (Ohm-cm) | 2.75E+01 | 3.83E+00 | 1.69E+00 | 2.14E+03 | 1.41E+03 | 1.94E+01 |

FIG. 1D

Table 2A

| Sample No. | C1.2 | C2.2 | C3.2 | Ex1.2 | Ex2.2 | Ex3.2 |
|---|---|---|---|---|---|---|
| Filler | | | VP417 | | | |
| Functional agent | | None | | 10wt% Lotader AX8900 | | |
| Wt % filler | 21.6 | 38.3 | 51.6 | 21.6 | 38.2 | 51.4 |
| Vol% graphite loading | 10 | 20 | 30 | 10 | 20 | 30 |
| Through-plane TC (W/mK) | 0.26 | 0.40 | 0.48 | 0.34 | 0.41 | 0.49 |
| In-plane TC (W/mK) | 0.80 | 2.18 | 5.59 | 1.03 | 2.13 | 4.71 |
| Bulk TC* (W/mK) | 0.46 | 0.93 | 1.63 | 0.59 | 0.93 | 1.52 |
| Vol. Resist. (Ohm-cm) | 2.92E+06 | 35.38 | 6.75 | 1.73E+08 | 1.73E+08 | 1.09E+07 |

| Sample No. | C4.2 | C5.2 | C6.2 | Ex4.2 | Ex5.2 | Ex6.2 |
|---|---|---|---|---|---|---|
| Filler | | | VP418 | | | |
| Functional agent | | None | | 10wt% Lotader AX8900 | | |
| Wt % filler | 21.6 | 38.3 | 51.6 | 21.6 | 38.2 | 51.4 |
| Vol% graphite loading | 10 | 20 | 30 | 10 | 20 | 30 |
| Through-plane TC (W/mK) | 0.21 | 0.29 | 0.40 | 0.25 | 0.32 | 0.38 |
| In-plane TC (W/mK) | 1.26 | 1.85 | 4.40 | 0.85 | 1.77 | 2.74 |
| Bulk TC* (W/mK) | 0.51 | 0.73 | 1.32 | 0.46 | 0.75 | 1.02 |
| Vol. Resist. (Ohm-cm) | 1.70E+08 | 589.92 | 12.5 | 1.7E+08 | 1.7E+08 | 8.97E+07 |

FIG. 2A

Table 2B

| Sample No. | C7.2 | C8.2 | C9.2 | Ex7.2 | Ex8.2 | Ex9.2 |
|---|---|---|---|---|---|---|
| Filler | VP417 | | | | | |
| Functional agent | None | | | 10wt% Fusabond P613-05 | | |
| Wt % Filler | 21.6 | 38.3 | 51.6 | 21.6 | 38.3 | 51.6 |
| Vol% graphite loading | 10 | 20 | 30 | 10 | 20 | 30 |
| Through-plane TC (W/mK) | 0.26 | 0.40 | 0.48 | 0.30 | 0.41 | -- |
| In-plane TC (W/mK) | 0.80 | 2.18 | 5.59 | 0.85 | 2.12 | -- |
| Bulk TC* (W/mK) | 0.46 | 0.93 | 1.63 | 0.50 | 0.93 | -- |
| Vol. Resist. (Ohm-cm) | 2.92E+06 | 35.38 | 6.75 | 9.19E+04 | 42.53 | 11.09 |

| Sample No. | C10.2 | C11.2 | C12.2 | Ex10.2 | Ex11.2 | Ex12.2 |
|---|---|---|---|---|---|---|
| Filler | VP418 | | | | | |
| Functional agent | None | | | 10wt% Fusabond P613-05 | | |
| Wt % Filler | 21.6 | 38.3 | 51.6 | 21.6 | 38.3 | 51.6 |
| Vol% graphite loading | 10 | 20 | 30 | 10 | 20 | 30 |
| Through-plane TC (W/mK) | 0.21 | 0.29 | 0.40 | 0.23 | 0.27 | 0.43 |
| In-plane TC (W/mK) | 1.26 | 1.85 | 4.40 | 0.81 | 0.93 | 3.35 |
| Bulk TC* (W/mK) | 0.51 | 0.73 | 1.32 | 0.43 | 0.50 | 1.20 |
| Vol. Resist. (Ohm-cm) | 1.70E+08 | 589.92 | 12.51 | 1.70E+08 | 710.8 | 15.99 |

FIG. 2B

Table 3

| | Sample No. | C1.3 | Ex1.3 |
|---|---|---|---|
| | Vol% graphite | 20 | 20 |
| | Vol% Millicarb | 10 | 10 |
| | Functional agent (wt%) | | 5 |
| Feeder 1 (Throat) | | A1 | A2 |
| | 400 GA 05 (PP COPOL) | 46.8 | 41.9 |
| | Lotader AX8900 | -- | 5.0 |
| Feeder 2 (Barrel 4) | | | |
| | Mechanolube 4G | 33.3 | 33.2 |
| Feeder 3 (Barrel 6) | | | |
| | Millicarb | 19.9 | 19.9 |
| | Total | 100.0 | 100.0 |

| Properties | Unit | Test | | |
|---|---|---|---|---|
| Young's Modulus | Mpa | ISO527 | 3492 | 2589 |
| Maximum stress | Mpa | ISO527 | -- | -- |
| Stress at fail | Mpa | ISO527 | 18.7 | 21.3 |
| Nominal strain at break | % | ISO527 | 11.7 | 5.2 |
| Unnotched impact strength | kJ/m² | ISO 180/1U | 36.13 | 36.42 |
| HDT/Af, 1.8 MPa Flatw 80*10*4 sp=64mm | °C | ISO 75/Af | 68 | 55 |
| Through-plane TC | W/mK | ASTM E1461-07 | 0.99 | 1.07 |
| Volume resistivity | Ohm-cm | SABIC Method | 1.6E+02 | 1.3E+05 |
| MVR 230 °C, 10 kg | cm³/10 min | ISO 1133 | 10.3 | 3.8 |

FIG. 3

Table 4

| Sample No. | | C1.4 | Ex1.4.1 | Ex1.4.2 |
|---|---|---|---|---|
| | | B2 | B3 | B4 |
| Feeder 1 (Throat) | | | | |
| Hostalen GC-7260 NAT | | 27.1 | 17.1 | 17.1 |
| Fusabond E-265 | | | 10.0 | 10.0 |
| Entirabond 12 | | 57.2 | 57.2 | 57.2 |
| Millicarb/Hostalen GC-7260 (65.2/34.8 wt%/wt%) MB | | | | |
| Feeder 3 (Section 6) | | | | |
| Mechanolube 4G | | 15.7 | 15.7 | 15.7 |
| Total | | 100.0 | 100.0 | 100.0 |

| Properties | Unit | Test | | | |
|---|---|---|---|---|---|
| Young's Modulus | Mpa | ISO527 | 3831 | 3672 | 2935 |
| Stress at fail | Mpa | ISO527 | 20.9 | 28.2 | 26.3 |
| Nominal strain at break | % | ISO527 | 2.6 | 9.0 | 5.1 |
| Unnotched impact strength | kJ/m² | ISO 180/1U | 7.5 | 16.5 | 23.5 |
| HDT/Af, 1.8 MPa Flatw 80*10*4 sp=64mm | °C | ISO 75/Af | 71 | 70 | 62 |
| Through-plane TC | W/mK | ASTM E1461-07 | 1.27 | 1.27 | 1.18 |
| Volume resistivity | Ohm-cm | SABIC Method | 3.36+05 | >1E+08 | >1E+08 |
| MV (245 °C, 1500s-1) | cm³/10 min | ISO 11443 | 181 | 226 | 207 |

FIG. 4

Table 5

| KS6 experiments - 1 to 20 wt% Lotader AX8900 | | | | | |
|---|---|---|---|---|---|
| Sample No. | C1.5 | Ex1.5.1 | Ex1.5.2 | Ex1.5.3 | Ex1.5.4 |
| PP595A (powder) (wt%) | 48.4 | 47.4 | 43.5 | 38.6 | 28.8 |
| Lotader AX8900 (wt%) | - | 1.0 | 5.0 | 10.0 | 20.0 |
| Imerys KS6 (wt%) | 51.6 | 51.6 | 51.5 | 51.4 | 51.2 |
| Total (wt%) | 100 | 100 | 100 | 100 | 100 |
| Vol % graphite loading | 30 | 30 | 30 | 30 | 30 |
| Through-plane TC (W/mK) | 0.530 | 0.506 | 0.608 | 0.712 | 0.761 |
| In-plane TC (W/mK) | 6.068 | 6.181 | 6.280 | 6.142 | 6.430 |
| Bulk TC* (W/mK) | 1.793 | 1.769 | 1.953 | 2.091 | 2.212 |
| Volume resist. (Ohm-cm) | 3.36E+00 | 8.11E+00 | 8.68E+03 | 1.14E+05 | 6.31E+05 |

FIG. 5

Table 6A

| Sample No. | PP - 1 wt% Joncryl ADR 4368C | | | | | |
|---|---|---|---|---|---|---|
| | C1.6 | C2.6 | C3.6 | Ex1.6 | Ex2.6 | Ex3.6 |
| PP595A (powder) (wt%) | 78.35 | 61.67 | 48.41 | 67.4 | 50.7 | 37.5 |
| Joncryl ADR 4368C (wt%) | - | - | - | 1.0 | 1.0 | 1.0 |
| Imerys KS6 (wt%) | 21.65 | 38.33 | 51.59 | 21.6 | 38.3 | 51.5 |
| Total (wt%) | 100 | 100 | 100 | 100 | 100 | 100 |
| Vol % graphite loading | 10 | 20 | 30 | 10 | 20 | 30 |
| Through-plane TC (W/mK) | 0.268 | 0.376 | 0.530 | 0.352 | 0.395 | 0.536 |
| In-plane TC (W/mK) | 1.111 | 3.007 | 6.068 | 1.052 | 2.959 | 5.784 |
| Bulk TC* (W/mK) | 0.546 | 1.063 | 1.793 | 0.609 | 1.081 | 1.760 |
| Volume resist. (Ohm-cm) | 3.75E+05 | 2.80E+01 | 3.36E+00 | 8.88E+10 | 3.91E+03 | 7.73E+01 |

FIG. 6A

Table 6B

| Sample No. | PA6 - 1 wt% Joncryl ADR 4368C | | | | | |
|---|---|---|---|---|---|---|
| | C4.6 | C5.6 | C6.6 | Ex4.6 | Ex5.6 | Ex6.6 |
| PA6 (powder) (wt%) | 82.0 | 67.0 | 54.2 | 81.0 | 66.0 | 53.2 |
| Joncryl ADR 4368C (wt%) | - | - | - | 1.0 | 1.0 | 1.0 |
| Imerys KS6 (wt%) | 18.0 | 33.0 | 45.8 | 18.0 | 33.0 | 45.8 |
| Total (wt%) | 100 | 100 | 100 | 100 | 100 | 100 |
| Vol % graphite loading | 10 | 20 | 30 | 10 | 20 | 30 |
| Through-plane TC (W/mK) | 0.544 | 0.650 | 0.829 | 0.426 | 0.444 | 0.693 |
| In-plane TC (W/mK) | 1.369 | 4.096 | 8.024 | 1.556 | 4.359 | 7.527 |
| Bulk TC* (W/mK) | 0.863 | 1.632 | 2.579 | 0.814 | 1.392 | 2.283 |
| Volume resist. (Ohm-cm) | 1.92E+10 | 2.22E+04 | 7.34E+02 | 3.37E+10 | 8.07E+04 | 3.87E+03 |

FIG. 6B

Table 6C

| Sample No. | PBT - 1 wt% Joncryl ADR 4368C ||||||
|---|---|---|---|---|---|---|
| | C7.6 | C8.6 | C9.6 | Ex7.6 | Ex8.6 | Ex9.6 |
| PBT (powder) (wt%) | 84.0 | 70.0 | 57.6 | 82.9 | 68.9 | 56.5 |
| Joncryl ADR 4368C (wt%) | - | - | - | 1.0 | 1.0 | 1.0 |
| Imerys KS6 (wt%) | 16.0 | 30.0 | 42.4 | 16.1 | 30.1 | 42.5 |
| Total (wt%) | 100 | 100 | 100 | 100 | 100 | 100 |
| Vol % graphite loading | 10 | 20 | 30 | 10 | 20 | 30 |
| Through-plane TC (W/mK) | 0.473 | 0.555 | 0.736 | 0.320 | 0.393 | 0.590 |
| In-plane TC (W/mK) | 1.095 | 3.276 | 6.501 | 1.254 | 3.809 | 7.055 |
| Bulk TC* (W/mK) | 0.719 | 1.348 | 2.187 | 0.634 | 1.223 | 2.041 |
| Volume resist. (Ohm-cm) | 8.45E+06 | 6.44E+02 | 9.21E+01 | 1.13E+10 | 3.70E+06 | 1.39E+03 |

FIG. 6C

Table 7

| PEI (ULTEM) - 10 wt% functional agent (Lotader AX8900) | | | | | | |
|---|---|---|---|---|---|---|
| Sample No. | C1.7 | C2.7 | C3.7 | Ex1.7 | Ex2.7 | Ex3.7 |
| Ultem 1010 (powder) (wt%) | 83.6 | 69.3 | 56.8 | 73.0 | 58.2 | 45.3 |
| Lotader AX8900 (wt%) | - | - | - | 10.0 | 10.0 | 10.0 |
| Imerys KS6 (wt%) | 16.4 | 30.7 | 43.2 | 17.0 | 31.8 | 44.7 |
| Total (wt%) | 100 | 100 | 100 | 100 | 100 | 100 |
| Vol % graphite loading | 10 | 20 | 30 | 10 | 20 | 30 |
| extrusion temperature (deg C) | 360 | 360 | 380 | 360 | 360 | 380 |
| Through-plane TC (W/mK) | - | 0.350 | - | - | 0.425 | - |
| In-plane TC (W/mK) | - | 3.098 | - | - | 2.578 | - |
| Bulk TC* (W/mK) | - | 1.042 | - | - | 1.046 | - |
| Volume resist. (Ohm-cm) | 4.99E+09 | 2.88E+04 | 2.87E+03 | 8.86E+10 | 1.31E+06 | 1.18E+03 |

FIG. 7

GRAPHITE-BASED COMPOSITIONS WITH INCREASED VOLUME RESISTIVITY

CROSS-REFERENCE TO RELATED APPLICATION

This application is the National Stage of International Application No. PCT/IB2018/052216 filed Mar. 29, 2018, which claims the benefit of European Application No. 17305383.6 filed Mar. 30, 2017, the disclosures of which are incorporated herein by this reference in their entireties.

TECHNICAL FIELD

This disclosure concerns graphite-based compositions with increased volume resistivity and articles made therefrom.

BACKGROUND

Heat management is becoming important in several emerging applications such as electronics, LED lighting as well as power and battery systems. For consumer electronics devices and LED-lighting applications, heat accumulation during use may decrease the device efficiency and may shorten life span. From a user's perspective the accumulated heat may cause the device to be uncomfortable to the touch. To reduce the temperature, heat sinks are employed. They dissipate the heat away from the source and spread it over a large area through convection. Today, heat sinks are commonly made out of aluminum, as it represents a good compromise between desirable properties such as low weight, thermal conductivity and cost.

With housings/heat sinks made from electrically conducting materials such as aluminum, an insulative material typically separates the electronic components from the heat sink to prevent short circuiting. Inclusion of an insulative material increases both manufacturing complexity and cost. Further, metal-based materials are more difficult to process than alternative material solutions, which reduces freedom in part design.

Compared to metal solutions, thermoplastics, for example, are 1) easier to process, which give more freedom in parts design, 2) significantly more lightweight and 3) electrically insulative. Thus, thermoplastics could provide desirable properties and represent a promising alternative to aluminum and metals in general, although they may need to be modified with electrically insulative, thermal conductive fillers to meet performance requirements. One particular filler of interest is graphite, as it offers outstanding thermal conductivity properties. However, as graphite is electrically conductive this conductivity would need to be inhibited to fulfill the needs of this specific application domain.

In addition, materials based on boron nitride exist for high thermally conductive and electrically insulative applications. However, the costs of boron nitride as well as the high filler loadings required (to achieve high thermal conductivity) make its use cost prohibitive, making this solution unappealing as an alternative to aluminum for common applications.

These and other shortcomings are addressed by aspects of the present disclosure.

DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 1A-1D are Tables 1A-1D showing exemplary compositions formed according to aspects of the disclosure and reference examples that do not include a functional agent element.

FIGS. 2A and 2B are Tables 2A and 2B showing exemplary compositions formed according to aspects of the disclosure and reference examples that do not include a functional agent element.

FIG. 3 is Table 3 showing an exemplary composition formed according to aspects of the disclosure and a reference example that does not include a functional agent element.

FIG. 4 is Table 4 showing exemplary compositions formed according to aspects of the disclosure and a reference example that does not include a functional agent element.

FIG. 5 is Table 5 showing exemplary compositions formed according to aspects of the disclosure and a reference example that does not include a functional agent element.

FIGS. 6A-6C are Tables 2A-2C showing exemplary compositions formed according to aspects of the disclosure and reference examples that do not include a functional agent element.

FIG. 7 is Table 7 showing exemplary compositions formed according to aspects of the disclosure and reference examples that do not include a functional agent element.

SUMMARY

Figure 1E:
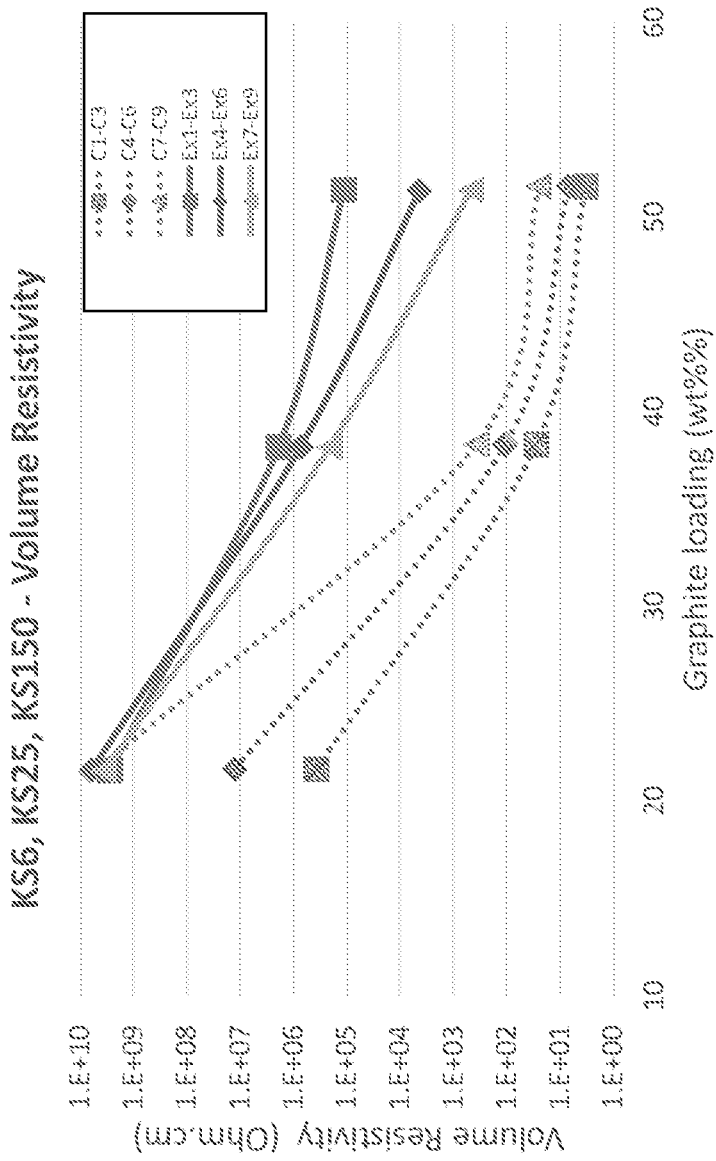
FIGS. 1E and 1F are graphs showing data for volume resistivity or thermal conductivity versus filler loading for compositions shown in FIGS. 1A-1C.

Aspects of the disclosure relate to a blended thermoplastic composition including: from about 20 wt % to about 99 wt % of a thermoplastic polymer element; from about 1 wt % to about 60 wt % of a graphite-based filler element including at least about 0.01 wt % functional groups on a surface of the graphite-based filler element; from about 0.1 wt % to about 30 wt % of a functional agent element; and from about 0 to about 50 wt % of a thermally conductive and electrically insulative filler. The functional agent element includes functional groups that interact with the functional groups on the surface of the graphite-based filler element, resulting in an increase of the volume resistivity of the blended thermoplastic composition that is at least $1*10^2$ greater than the volume resistivity of a substantially identical electrically conductive blended thermoplastic composition that does not include a functional agent element.

Aspects of the disclosure further relate to a blended thermoplastic composition including: from about 20 wt % to about 99 wt % of a thermoplastic polymer element; from about 1 wt % to about 60 wt % of a pre-treated graphite-based filler element including at least about 0.01 wt % functional groups on a surface of the pre-treated graphite-based filler element; from about 0.1 wt % to about 30 wt % of a functional agent element; and from about 0 to about 50 wt % of a thermally conductive and electrically insulative filler. The pre-treated graphite-based filler element is pretreated to increase content of functional groups on the surface of the pre-treated graphite-based filler element. The functional agent element includes a thermoplastic polymer that includes functional groups that interact with the functional groups on the surface of the pre-treated graphite-based filler element, resulting in an increase of the volume resistivity of the blended thermoplastic composition that is at least $1*10^2$ greater than the volume resistivity of a substantially identical electrically conductive blended thermoplastic composition that does not include a pre-treated graphite-based filler element.

DETAILED DESCRIPTION

The present disclosure can be understood more readily by reference to the following detailed description of the disclosure and the Examples included therein. However, before the present compounds, compositions, articles, devices, and/or methods are disclosed and described, it is to be understood that the aspects described below are not limited to specific synthetic methods as such may, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are necessarily to be limited to a specific order, it is no way intended that an order be inferred, in any respect. Having said this, the presentation of steps in a given order may be considered to represent one aspect of such a method. This holds for any possible non-express basis for interpretation, including: matters of logic with respect to arrangement of steps or operational flow; plain meaning derived from grammatical organization or punctuation; and the number or type of aspects described in the specification.

Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate polymer" includes mixtures of two or more polycarbonate polymers.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. Thus, if a class of fillers A, B, and C are disclosed as well as a class of additives D, E, and F and an example of a combination A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, compositions, and steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

References in the specification and concluding claims to parts by weight or volume, of a particular element or component in a composition or article, denotes the weight or volume relationship, respectively, between the element or component and any other elements or components in the composition or article for which a part by weight or volume, respectively, is expressed. Thus, in a composition containing 2 parts by weight of component X and 5 parts by weight component Y, X and Y are present at a weight ratio of 2:5, and are present in such ratio regardless of whether additional components are contained in the composition. This example is equally applicable to parts by volume.

As used herein, the terms "weight percent" and "wt %" of a component, which can be used interchangeably, unless specifically stated to the contrary, are based on the total weight of the formulation or composition in which the component is included. For example if a particular element or component in a composition or article is said to have 8% by weight, it is understood that this percentage is relative to a total compositional percentage of 100% by weight.

As used herein, the term "electrical percolation threshold" traditionally refers to the critical concentration or loading of the standard graphite-based filler element in the composition where the conductivity value of the composition rises significantly. Below this threshold the composition is an insulator, while above the threshold the composition becomes electrically conductive. The particle size and geometry of the graphite-based filler element are factors affecting the electrical percolation threshold.

An "electrically conductive" material, element, composition, article, etc., as this term is described herein, has an electrical resistivity of less than $10^8$ Ohm-centimeters (Ohm-cm). The term "electrical resistivity" is used interchangeably herein with "volume resistivity," which is described below.

As used herein, the term "interact" refers to the formation of covalent bonding, non-covalent interactions or a combination thereof between functional groups either present on a polymer, filler, additive or functional agent that may occur under specific conditions including but not limited to high temperature. The covalent bonding is characterized by electron sharing between the functional groups and non-covalent interactions and may include, but is not necessarily limited to, hydrogen bonding, ionic interaction, dipole-dipole, dipole-induced dipole, London dispersion forces and $\pi$ effects.

As used herein, the term "graphite-based filler element" refers to graphite materials, either natural or synthetic, having a particle size ranging from 1 nm to 500 microns and a surface containing >0.01% functional groups. Graphite-based filler elements may include, but are not limited to untreated, standard graphite elements, plasma treated graphite elements, acid treated/surface-modified graphite elements including graphite, expanded graphite, graphene, carbon fiber, carbon nanotube (CNT), graphitized carbon black, or combinations thereof.

As used herein, the term "functional groups" refers to any chemical group that a polymer, filler, additive or functionalizing agent may contain and that is capable of forming covalent bonds or non-covalent interactions.

As used herein, "functional agent" refers to an additive, either polymeric or non-polymeric low molecular weight, containing specific functional groups making it capable of interacting with the functional groups present on the graphite filler surface and potentially the thermoplastic matrix.

As used herein, a "substantially identical" composition refers to a comparative composition that includes the same proportions and components as the inventive composition but that does not include the stated component. For example and without limitation, in some aspects of the disclosure a "substantially identical electrically conductive blended thermoplastic composition that does not include a functional agent element" is an electrically conductive blended thermoplastic composition that includes the same proportions and components as the inventive blended thermoplastic composition but that does not include a functional agent element.

Each of the materials disclosed herein are either commercially available and/or the methods for the production thereof are known to those of skill in the art.

Intrinsic thermal conductivity of a component, as used herein, is based on indicative values described in the literature, such as in "Thermal conductivity of Nonmetallic Solids," Y. S. Touloukian, R. W. Powell, C. Y. Ho, and P. G. Klemans, IFI/Plenum: New York-Washington, 1970 or "Thermal Conductivity—Theory, Properties and Applications," T. M. Tritt, Ed., Kluwer Academic/Plenum Publishers: New York, 2004. Thermal conductivity of a composition, as used herein, is tested according to ISO 22007-2 (in-plane and through-plane conductivity) or ASTM E-1461 (through-plane conductivity) as a standard.

Volume resistivity, as used herein, is measured by notching a sample bar on both ends followed by a cold-fracture at about –60 degrees Celsius (° C.). The fractured surfaces are treated with silver paint and dried. The resistance through the bar is measured with a multi-meter and the volume resistivity (in Ohm ($\Omega$)-cm) is calculated according to: volume resistivity=(R*w*h/l), where R is the electrical resistance (in $\Omega$), w the width of the bar in cm, h the height of the bar in cm, and 1 is the sample length (the electrical distance) in cm. Volume resistivity is used interchangeably herein with electrical resistivity, described above, and the method for determining volume resistivity/electrical resistivity is referred to herein as the "SABIC Method."

Volume resistivity of untreated and pre-treated graphite fillers may be measured using polyetheretherketone cells that filled with the graphite filler and then compacted by applying a force of 128 Newton (N). The cells are then connected to a VMP-300 potentiostat from Bio-logic to apply a voltage and measure the current, which can further be used to determine the resistance of the system and therefore calculate the volume resistivity. The maximum volume resistivity that can be measured by this method is $1.0 \times 10^8$ $\Omega$-cm.

Thermoplastic Polymer Element

Blended thermoplastic compositions according to aspects of the disclosure include a thermoplastic polymer element. The thermoplastic polymer element may in some aspects be an organic polymer. Any suitable organic polymer or blend of organic polymers may be used. The thermoplastic polymer element can also include a blend of polymers, copolymers, terpolymers, or combinations including at least one of the foregoing organic polymers.

In particular aspects, the thermoplastic polymer element includes a polyolefin compound, a polyaryl sulfide compound, a polyamide compound, a polyester compound, a polycarbonate compound, a polyphenylene ether compound, a polyetherimide compound, a polyimide compound, copolymers comprising any of these compounds, blends comprising any of these compounds, and combinations thereof. The thermoplastic polymer element may include one or more resins.

Exemplary polyolefin compounds include, but are not limited to, polyethylene (PE), including high density polyethylene (HDPE), linear low-density polyethylene (LLDPE), low-density polyethylene (LDPE), mid-density polyethylene (MDPE), and polypropylene (PP).

Particular exemplary polyolefin compounds suitable for use in aspects of the disclosure include, but are not limited to, polyethylene (PE), including high density polyethylene (HDPE) as described above, linear low-density polyethylene (LLDPE), low-density polyethylene (LDPE), mid-density polyethylene (MDPE), glycidyl methacrylate modified polyethylene, maleic anhydride functionalized polyethylene, maleic anhydride functionalized elastomeric ethylene copolymers (like EXXELOR VA1801 and VA1803 from ExxonMobil), ethylene-butene copolymers, ethylene-octene copolymers, ethylene-acrylate copolymers, such as ethylene-methyl acrylate, ethylene-ethyl acrylate, and ethylene butyl acrylate copolymers, glycidyl methacrylate functionalized ethylene-acrylate terpolymers, anhydride functionalized ethylene-acrylate polymers, anhydride functionalized ethylene-octene and anhydride functionalized ethylene-butene copolymers, polypropylene (PP) as described above, maleic anhydride functionalized polypropylene, glycidyl methacrylate modified polypropylene, polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyurethanes, or the like, or a combination including at least one of the foregoing organic polymers.

As used herein, "polycarbonate" refers to an oligomer or polymer comprising residues of one or more dihydroxy compounds, e.g. dihydroxy aromatic compounds, joined by carbonate linkages; it also encompasses homopolycarbonates, copolycarbonates, and (co)polyester carbonates.

Representative polyesters include, for example including polyethylene terephthalate ("PET"), polybutylene terephthalate ("PBT"), polyethylene naphthalate (PEN), polytrimethylene terephthalate (PTT), poly(1,4-cyclohexanedimethyl-1,4-cyclohexanedicarboxylate) (PCCD), copolymers of TPA, EG, and a secondary diol, cyclohexanedimethanol (e.g., PCTG and PETG), and TRITAN™ copolyesters.

As used herein, a polyamide is a polymer having repeating units linked by amide bonds, and can include aliphatic polyamides (e.g., the various forms of nylon such as nylon 6 (PA6), nylon 66 (PA66) and nylon 9 (PA9)), polyphthalamides (e.g., PPA/high performance polyamide) and aramides (e.g., para-aramid and meta-aramid).

In one aspect, the thermoplastic polymer can also act as the functional agent element, provided that it contains specific functional groups such as but not limited to amine, maleic anhydride, epoxide, and hydroxyl groups, that can interact with functional groups on the surface of the graphite-based filler element as described further herein. Exemplary thermoplastic polymers that may in some aspects act as the functional agent element include, but are not limited to, polyamide (including aromatic polyamides), ethylene-methylacrylate-glycidylacrylate copolymer, ethylene-glycidylmethacrylate copolymer, poly(vinyl alcohol), polybutylene terephthalate, copolymers thereof, and combinations thereof.

The blended thermoplastic composition according to aspects of the disclosure includes from about 20 wt % to about 99 wt % of the thermoplastic polymer element. In particular aspects, the blended thermoplastic composition includes from about 20 wt % to about 90 wt % of the thermoplastic polymer element, from about 20 wt % to about 50 wt % of the thermoplastic polymer element, from about 40 wt % to about 90 wt % of the thermoplastic polymer element, or from about 40 wt % to about 70 wt % of the thermoplastic polymer element. In still further aspects, the blended thermoplastic composition includes from about 20 wt % to about 80 wt % of the thermoplastic polymer element.

Graphite-Based Filler Element

The graphite-based filler element used in aspects of the present disclosure can be synthetically produced or processed from natural sources. The particle size of the filler element typically ranges from about 0.1 micron (μm) to about 800 microns and the surface contains >0.01% functional groups. Typical smaller sized graphite element platelets contain more functional groups and larger sized graphite element particles contain fewer functional groups at the edges of the graphite planar surface. The graphite element particles can be in the shape of flakes, platelets or spheres, each of which provide different length to diameter ratios and eventually a difference in thermal and electrical conductivities of the polymer graphite filled material. In some aspects the graphite-based filler element is amorphous graphite, while in other aspects it is crystal vein graphite. In a particular aspect, the graphite-based filler element is flake graphite, wherein the flake graphite is typically found as discrete flakes ranging in size from 10-800 micrometers in diameter and 1-150 micrometers thick with a purity ranging from about 80-99.9% carbon. In another aspect, the graphite-based filler element is spherical.

Graphite-based filler elements may include, but are not limited to untreated, standard graphite elements, plasma treated graphite elements, acid treated/surface-modified graphite elements including graphite, expanded graphite, graphene, carbon fiber, carbon nanotube (CNT), graphitized carbon black, or a combination thereof.

The graphite-based filler element may include oxygen functional groups on or at the edges or on the planar surface of the composition.

In a further aspect, the functional groups of the graphite-based filler element include, but are not limited to carboxylic acid, hydroxyl, aldehyde or ketone groups. In some aspects the functional groups located on or at the edge or on the planar surface of the graphite filler element are capable of forming covalent bonds or non-covalent interactions with functional groups of the functional agent element. In a particular aspect, the graphite-based filler element includes carboxylic acid functional groups and the functional agent element includes epoxy, maleic anhydride or amine functional groups and the carboxylic acid functional groups of the graphite-based filler element interact with the epoxy, maleic anhydride or amine functional groups of the functional agent element. This leads to separation between the graphite platelets, and the distance created between the platelets results in an increase in the overall volume resistivity and a reduction in the electrical conductivity of the composition. Acceptable thermal conductivity properties may be maintained, however.

In some aspects "acceptable thermal conductivity properties" means that the thermal conductivity of the blended thermoplastic composition, or an article made therefrom, is at least 0.6 watts per meter-Kelvin (W/m-K) in one or more of the in-plane direction, the through-plane direction, or in the bulk thermoplastic composition. In particular aspects "acceptable thermal conductivity properties" means that the thermal conductivity of the blended thermoplastic composition, or an article made therefrom, is at least 0.9 watts per meter-Kelvin (W/m-K) in one or more of the in-plane direction, the through-plane direction, or in the bulk thermoplastic composition. In other aspects acceptable thermal conductivity properties means that the thermal conductivity of the blended thermoplastic composition, or an article made therefrom, is high enough for the application in which the composition/article will be used. In yet further aspects acceptable thermal conductivity properties means that the thermal conductivity of the blended thermoplastic composition, or an article made therefrom, is within about 10% of that of an article made from a conventional thermally conductive article. In still further aspects acceptable thermal conductivity properties means that the thermal conductivity of the blended thermoplastic composition, or an article made therefrom, is within about 20%, or within about 30%, or within about 40%, or within about 50%, of that of an article made from a conventional thermally conductive article.

In some aspects an untreated graphite-based filler element may be combined with other filler elements. Such a combination may result in an electrically insulative article with acceptable thermal conductivity properties which may be more cost effective for the user.

Pre-Treated Graphite Filler

In some aspects the graphite-based filler element may be pre-treated to increase the content of oxygen-based functional groups, nitrogen-based functional groups or combination thereof located on or at the edge or on the planar surface of the graphite filler element. In such aspects the amount of functional groups available for interacting with the functional agent element will increase.

In certain aspects the pre-treatment may include any processes that locates functional groups on or at the edge or on the planar surface of the graphite filler element that are capable of forming covalently bonding or having non-covalent interactions with the functional groups of the functional agent element.

In one aspect, MAH may be introduced to the edge or planar surface of the graphite-based filler element so that it can interact with the functional groups of the functional agent element such as but not limited to amine and carboxylic acid groups, wherein the functional agent element includes a polymeric or a non-polymeric low molecular weight element.

In a particular aspect, a blended thermoplastic composition may include a MAH-modified graphite as the graphite-based filler element and a polyamide as the thermoplastic polymer element such that the MAH in the MAH-modified graphite directly forms a covalent bond with the amine end groups of the polyamide. In this particular aspect the amine end groups of the polyamide would operate as a functional agent element in the blended thermoplastic composition.

Plasma Treated Graphite Filler

In some aspects the graphite-based filler element includes oxygen-based functional groups, nitrogen-based functional groups, or a combination thereof. The graphite-based filler element may in some aspects be pre-treated by a plasma process to increase content of the oxygen-based functional groups or the nitrogen-based functional groups on the surface of the graphite-based filler element.

Plasma treatment of the graphite-based filler element is a form of surface modification utilizing specific gases on ionized stage to functionalize the surface with functional groups on the planar surface and on the edges of the graphite. This results in an increased amount of functional residue groups capable of forming covalent bonds or non-covalent interactions with the functional agent element. Gases that may be used for the plasma treatment include, but are not limited to, air, oxygen, nitrogen, ammonia ($NH_3$), argon, helium or a combination thereof.

In an aspect, plasma treatment of the graphite-based filler element particles can include a surface modification with ionized gas to functionalize the surface with functional groups on the planar surface and on the edges of the particle followed by a step of including monomers to create a layer at the surface of the of the graphite particle (i.e., a two-step process). In another aspect, a gas/monomer mixture is used for plasma treatment with the simultaneous modification and creation of a layer on the surface of the graphite particle (i.e., a one-step process). This results in an increased amount of functional residue groups capable of forming covalent bonds or non-covalent interactions with the functional agent element. In these aspects, the level of volume resistivity of the plasma treated graphite filler may be greater for plasma-treated graphite-based filler elements relative to untreated graphite-based filler elements.

In further aspects, plasma treatment of graphite particles may be performed using nitrogen or ammonia plasma. The use of nitrogen or ammonia plasma to treat the planar surface and the edges of the graphite filler would introduce amine groups or amino acids thereto. Notably, in an aspect, the introduction of amine groups, acids, or the like may result in direct interaction of these groups with the functional groups of the functional agent element.

In one aspect, a graphite-based filler element sample may be plasma treated by radio frequency induction coupled with low-pressure Argon plasma. In a further aspect, a graphite-based filler element sample may be plasma treated with an electrodeless atmospheric microwave plasma using Argon as a quenching gas. In a still further aspect, a graphite-based filler element sample can be treated with an electrodeless atmospheric microwave plasma using nitrogen, oxygen/Ar gas mixtures, nitrogen/Ar gas mixtures, or ammonia/Ar gas mixtures. In any of these aspects other inert gases, including but not limited to helium, could replace argon.

Accordingly, in an aspect, plasma treatment of these graphite particles may increase the degree of functionalization of the oxygen and/or nitrogen groups on or at the edges and on the planar surface of the graphite-based filler element. In these aspects, the level of volume resistivity may be greater for plasma-treated graphite-based filler elements relative to untreated graphite-based filler elements.

In some aspects the blended thermoplastic composition described herein includes from about 1 wt % to about 60 wt %, or from about 20 wt % to about 50 wt %, of a plasma-treated graphite-based filler element, wherein the composition does not include a functional agent element. In other aspects the blended thermoplastic composition includes from about 1 wt % to about 60 wt %, or from about 20 wt % to about 50 wt %, of a plasma-treated graphite-based filler element, wherein the composition includes a functional agent element.

Acid Treated Graphite Filler

The graphite-based filler element may in some aspects be pre-treated by an oxidizing process with an acid element. Acid treatment of graphite platelets is a form of surface modification that utilizes oxidation through oxidizing acids such as, but not limited to nitric acid, chromic acid, potassium chlorate, and sulfuric acid. In an aspect, acid modification of the planar surface and at or on edges of the graphite-based filler element results in an increased content of oxygen-based functional groups available for interaction with the functional agent element.

Accordingly, in an aspect, acid modification of the graphite-based filler element increases the degree of functionalization of the oxygen groups on or at the edges and the planar surface of the graphite-based filler element. In these aspects, the level of volume resistivity may be slightly greater for acid-modified graphite-based filler elements relative to untreated graphite-based filler elements.

In some aspects the blended thermoplastic composition described herein includes from about 1 wt % to about 60 wt %, or from about 20 wt % to about 50 wt %, of acid-treated graphite-based filler element, wherein the composition does not include a functional agent element. In other aspects the blended thermoplastic composition includes from about 1 wt % to about 60 wt %, or from about 20 wt % to about 50 wt %, of an acid-treated graphite-based filler element, wherein the composition includes a functional agent element.

Gas-treated Graphite Filler

In some aspects the graphite-based filler element may be pre-treated by a gas treatment that results in an increased content of functional groups at or on edges or on the surface of the graphite-based filler element and available for interaction with functional groups of the functional agent element. In certain aspects the gas treatment is a high-temperature oxygen or oxygen-containing gas mixture treatment, which may include air. In some aspects the high-temperature oxygen or oxygen-containing gas mixture treatment is carried out at a temperature between about 100° C. and about 500° C. In further aspects the gas treatment is an ozone treatment. In some aspects the ozone treatment may be carried out at room temperatures or at temperatures slightly exceeding room temperature. In yet further aspects the ozone treatment is carried out at a temperature between about 100° C. and about 300° C.

In some aspects the blended thermoplastic composition described herein includes from about 1 wt % to about 60 wt %, or from about 20 wt % to about 50 wt %, of a gas-treated graphite-based filler element, wherein the composition does not include a functional agent element. In other aspects the blended thermoplastic composition includes from about 1 wt % to about 60 wt %, or from about 20 wt % to about 50 wt %, of a gas-treated graphite-based filler element, wherein the composition includes a functional agent element.

Functional Agent Element

Blended thermoplastic compositions according to aspects described herein may include a functional agent element. The functional agent element may in some aspects have functional groups capable of forming covalent bonds or non-covalent interactions with the functional groups on or at the edge or on the surface of the graphite-based filler element, whether the graphite-based filler element has been treated or remains untreated. In an aspect, a functional agent element may include one or more polymers or copolymers that have been modified to contain functional groups including, but not limited to, maleic anhydride (MAH) groups, epoxy groups, amine groups or a combination thereof. In still a further aspect, the functional agent element may include a non-polymeric low molecular weight element. In yet another aspect the non-polymeric low molecular weight element includes functional groups including, but not limited to maleic anhydride (MAH), epoxy or amine groups. The functional groups of the functional agent element may interact with both the thermoplastic polymer element and with the functional groups of the graphite-based filler element. And as discussed above, in yet further aspects the thermoplastic polymer element may act as the functional agent element if the thermoplastic polymer element includes groups capable of interacting with the functional groups of the graphite-based filler element (e.g., the amine end groups of a polyamide thermoplastic polymer element).

In some aspects oxygen-based and/or nitrogen-based functional groups of the functional agent element forms covalent bonds or non-covalent interactions with oxygen based groups (such as but not limited to carboxylic acid groups) or nitrogen based groups (such as but not limited to amine groups) on or at the edge or on the surface of the graphite-based filler element. In certain aspects, the graphite-based filler element is untreated and the functional agent element interacts with the untreated surface or edge of the graphite-based filler element. In a further aspect, the functional agent element interacts with the surface or edge of a surface-treated, graphite-based filler element.

Blended thermoplastic compositions according to aspects of the disclosure may include one or more functional agent elements. In one aspect, the blended thermoplastic composition includes from about 0.1 wt % to about 30 wt % of the functional agent element. In other aspects the blended thermoplastic composition includes from about 5 wt % to about 20 wt % of the functional agent element. In further aspects the functional agent element is an epoxy-based element. In particular aspects the epoxy-based element may include an epoxy copolymer of a di/multi-functional glycidyl compound. Exemplary di/multi-functional glycidyl compounds include, but are not limited to, ethylene-glycidyl methacrylate, ethylene-methylacrylate-glycidylmethacrylate, ethylene-butylacrylate-glycidylmethacrylate, and combinations thereof.

In certain aspects the functional agent element includes a maleic anhydride (MAH) group, and the MAH group interacts with oxygen and/or nitrogen-based functional groups of the graphite-based filler element. The MAH group may in some aspects include a MAH copolymer of a di/multi-functional MAH compound. In still further aspects, the MAH group includes a MAH grafted polyethylene, polypropylene, copolymers thereof, or combinations thereof. A purely exemplary functional agent element that includes a MAH group is available from DuPont™ under the Fusabond® tradename.

In another aspect, the functional agent element includes a thermoplastic polymer that contains functional groups, such as but not limited to amine, MAH, epoxide, and hydroxyl groups, capable of forming covalent bonding or non-covalent interactions with functional groups located on the surface of the graphite-based filler element. Exemplary thermoplastic polymers suitable for use as the functional agent element include, but are not limited to, polyamide (including aromatic polyamides), ethylene-methylacrylate-glycidylacrylate copolymer, ethylene-glycidylmethylacrylate copolymer, poly(vinyl alcohol), polybutylene terephthalate, copolymers thereof, and combinations thereof. In some aspects the thermoplastic polymer includes the same thermoplastic polymer as the thermoplastic polymer element described above. In other aspects the thermoplastic polymer includes one or more different thermoplastic polymers as that (or those) included in thermoplastic polymer element described above.

In particular aspects the functional agent element includes a thermoplastic polymer that contains functional groups capable of forming covalent bonding or non-covalent interactions with functional groups located on the surface of the graphite-based filler element, and the graphite-based filler element is pre-treated as described above so as to increase the content of functional groups located on or at the edge or on the planar surface of the graphite filler element. The resulting blended thermoplastic composition may in some aspects have an increase of volume resistivity that is at least $1*10^2$ greater than the volume resistivity of a substantially identical electrically conductive blended thermoplastic composition that does not include a pre-treated graphite-based filler element.

In some aspects the blended thermoplastic composition described herein includes from about 0.1 wt % to about 30 wt % of a functional agent element. In other aspects the blended thermoplastic composition includes from about 5 wt % to about 20 wt % of a functional agent element.

Thermally Conductive and Electrically Insulative Filler

The blended thermoplastic composition further includes a thermally conductive and electrically insulative filler. Such fillers may provide the thermoplastic composition with non-conductive properties while not adversely affecting its thermal conductivity properties, which may be desirable in some aspects.

In some aspects the thermally conductive and electrically insulative filler has an intrinsic electrical resistivity greater than $10^8$ Ohm-centimeters (Ohm-cm) and an intrinsic thermal conductivity greater than 1 Watt per meter-Kelvin (W/(m-K)).

In one aspect, the thermally conductive and electrically insulative filler includes boron nitride (BN). One suitable boron nitride compound is hexagonal boron nitride (h-BN), which can be complete h-BN or turbostratic boron nitride (t-BN). The boron nitride can be in the form of particulate BN, and can be large-sized BN crystal powder, BN agglomerate, small sized BN particles, agglomerated spherical BN powder, BN fiber, or a combination thereof. Other thermally conductive and electrically insulative filler materials may of course be used.

In one aspect, the particle size (e.g., d90 particle size distribution) of the thermally conductive and electrically insulative filler can range from about 1 nanometer (nm) to about 500 micrometers (μm). In another aspect the thermally conductive and electrically insulative filler may have a particle size greater than or equal to about 3 μm, or greater than or equal to about 5 μm. The particle size referred to herein is to a single thermally conductive and electrically insulative filler particle or its agglomerate at any of its dimensions. In one aspect, the thermally conductive and electrically insulative filler has a purity ranging from about 95% to about 99.8%. In a particular aspect in which the thermally conductive and electrically insulative filler is BN, a large single crystal-sized flake BN with a particle size (e.g., d90 particle size distribution) ranging from 3 μm to 50 μm and a BN purity of over 98% is used.

In various aspects, the thermally conductive and electrically insulative filler may include, but is not limited to BN, $Mg(OH)_2$, MgO, $CaCO_3$, silica, alumina, aluminum silicate, ZnO, ZnS, talc and combinations thereof. The particle size of the thermally conductive and electrically insulative filler may range from about 1 nm to about 500 μm.

In some aspects the blended thermoplastic composition includes from about 0 to about 50 wt % of the thermally conductive and electrically insulative filler. In other aspects the blended thermoplastic composition includes from about 0.1 wt % to about 50 wt %, or from about 1 wt % to about 50 wt %, or from about 2 wt % to about 50 wt %, or from about 5 wt % to about 50 wt %, or from about 10 wt % to about 50 wt %, or from about 15 wt % to about 50 wt %, or from about 20 wt % to about 50 wt % of the thermally conductive and electrically insulative filler. In particular aspects the blended thermoplastic composition includes from about 0 to about 25 wt %, or from about 25 wt % to about 50 wt % of the thermally conductive and electrically insulative filler.

Optional Additives

In addition to the thermoplastic polymer resin and fillers, the compositions of the present disclosure can include various additives ordinarily incorporated in thermoplastic compositions of this type. Mixtures of additives can be used. Such additives can be mixed at a suitable time during the mixing of the components for forming the composition. The one or more additives are included in the thermoplastic compositions to impart one or more selected characteristics to the thermoplastic compositions and any molded article made therefrom. Examples of additives that can be included in the present disclosure include, but are not limited to, heat stabilizers, process stabilizers, antioxidants, light stabilizers, plasticizers, antistatic agents, mold releasing agents, UV absorbers, lubricants, pigments, dyes, colorants, flow promoters, flame retardants, or a combination of one or more of the foregoing additives.

Properties of Blended Thermoplastic Compositions

As briefly described above, the present disclosure generally relates to a blended thermoplastic composition including: from about 20 wt % to about 99 wt % of a thermoplastic polymer element; from about 1 wt % to about 60 wt % of a graphite-based filler element including at least about 0.01 wt % functional groups on a surface of the graphite-based filler element; from about 0.1 wt % to about 30 wt % of a functional agent element; and from about 0 to about 50 wt % of a thermally conductive and electrically insulative filler. The functional agent element includes functional groups that interact with the functional groups on the surface of the graphite-based filler element, resulting in an increase of the volume resistivity of the blended thermoplastic composition that is at least $1*10^2$ greater than the volume resistivity of a substantially identical electrically conductive blended thermoplastic composition that does not include a functional agent element.

The blended thermoplastic composition according to aspects of the present disclosure having a functional agent element with functional groups that interact with the functional groups on the surface of the graphite-based filler element has improved properties as compared to a substantially identical electrically conductive blended thermoplastic composition that does not include a functional agent element. Specifically, the interactions of the functional groups provide the blended thermoplastic composition with a significantly increased volume resistivity and thus a reduced electrical conductivity as compared to the substantially identical electrically conductive blended thermoplastic composition. In some aspects, the blended thermoplastic composition according to aspects of the present disclosure is below the electrical percolation threshold, or is not electrically conductive, while the substantially identical blended thermoplastic composition is above the electrical percolation threshold and is therefore electrically conductive.

As described more fully below, in certain aspects the interaction of a functional agent element in combination with a graphite-based filler element has been found to provide blended thermoplastic compositions with increased volume resistivity, while still providing acceptable thermal conductivity properties. Such interaction between the functional groups of these components provides improved properties in a low-cost graphite-based solution that is highly thermally conductive with an electrical conductivity that is significantly lower than a substantially identical electrically conductive blended thermoplastic composition that does not include the functional agent element. As a result, blended thermoplastic compositions according to further aspects of the disclosure may have a high graphite-based filler element loading—a loading that would otherwise be above the electrical percolation threshold for a substantially identical blended thermoplastic composition in the absence of a functional agent element (and the substantially identical blended thermoplastic composition would therefore be electrically conductive)—but the blended thermoplastic compositions according to aspects of the disclosure are below the electrical percolation threshold (i.e., are not electrically conductive).

Method of Manufacture

Blended thermoplastic compositions according to aspects described herein may be formed according to any conventional method. In some aspects the compositions are melt-blended. Melt blending of the thermoplastic composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

Melt blending involving the aforementioned forces can be conducted in machines such as single or multiple screw extruders, Buss kneader, Henschel, helicones, Ross mixer, Banbury, roll mills, molding machines such as injection molding machines, vacuum forming machines, blow molding machine, or the like, or combinations comprising at least one of the foregoing machines. In an aspect, the extruding is done with a twin-screw extruder.

In one aspect, the thermoplastic polymer element in powder form, pellet form, sheet form, or the like, can be first dry blended with the graphite-based filler element, functional agent element, optional thermally conductive and electrically insulative filler and optional additives in a Henschel or in a roll mill, prior to being fed into a melt blending device such as an extruder or Buss kneader. It can be desirable to introduce one or more of these components into the melt blending device in the form of a masterbatch. In such a process, the masterbatch can be introduced into the melt blending device downstream of the point where the thermoplastic polymer component is introduced.

A melt blend is one where at least a portion of the thermoplastic polymer component has reached a temperature greater than or equal to about the melting temperature, if the thermoplastic polymer component is a semi-crystalline organic polymer, or the flow point (e.g., the glass transition temperature) if the thermoplastic polymer component is an amorphous resin during the blending process. A dry blend is one where the entire mass of thermoplastic polymer component is at a temperature less than or equal to about the melting temperature if the thermoplastic polymer component is a semi-crystalline polymer, or at a temperature less than or equal to the flow point if the thermoplastic polymer component is an amorphous polymer and wherein the thermoplastic polymer component is substantially free of any liquid-like fluid during the blending process. A solution blend, as defined herein, is one where the thermoplastic polymer component is suspended in a liquid-like fluid such as, for example, a solvent or a non-solvent during the blending process.

The blended thermoplastic composition comprising the thermoplastic polymer component and other components can be subject to multiple blending and forming steps if desirable. For example, the blended thermoplastic composition can first be extruded and formed into pellets. The pellets can then be fed into a molding machine where it can be formed into any desirable shape or product. Alternatively, the moldable composition emanating from a single melt blender can be formed into sheets or strands and subjected to post-extrusion processes such as annealing, uniaxial or biaxial orientation.

In an aspect, the thermoplastic polymer element, graphite-based filler element, functional agent element, optional thermally conductive and electrically insulative filler and optional additives may be dispersed and/or dissolved in solution for the purpose of coating a substrate.

In further aspects the blended thermoplastic composition including the thermoplastic polymer element, graphite-based filler element, functional agent element, optional thermally conductive and electrically insulative filler and optional additives can be subject to multiple blending and forming steps if desirable. For example, the blended thermoplastic composition can first be extruded and formed into pellets. The pellets can then be fed into a molding machine where it can be formed into any desirable shape or product. Alternatively, the blended thermoplastic composition exiting a single melt blender can be formed into sheets or strands and subjected to post-extrusion processes such as annealing, uniaxial or biaxial orientation.

In an aspect, the compounding operation includes feeding the graphite-based filler element and the functional agent element into an extruder to form a component that may be further processed by further extrusion or injection molding techniques. In an aspect, the extruder is a twin-screw extruder. In a further aspect, direct compounding and extrusion of the blended thermoplastic composition may be used to form an article.

In certain aspects, the graphite-based filler element is introduced to the blended thermoplastic composition after the thermoplastic polymer element and the functional agent element have been mixed. The optional thermally conductive and electrically insulative filler element may be fed together with or separately from the graphite-based filler element. In a further aspect the graphite-based filler element, the functional agent element and the optional thermally conductive and electrically insulative filler element are fed as masterbatches, where the masterbatch includes one or more of these components.

The blended thermoplastic composition formed according to methods described herein can be formed into moldable stock material or moldable articles using techniques known to those in the art.

Articles of Manufacture

As discussed herein, the blended thermoplastic compositions of the present disclosure can be formed into an article of manufacture. In one aspect the article is a molded article. In certain aspects the articles are used in heat or thermal dissipation management applications where electrical insulation is required. Examples include, but are not limited to, direct printing electronics onto thermoplastic heat sinks, direct overmolding of electronics such as overmolding of a LED lead-frame in automotive forward lighting applications, automotive ECU housings, enclosures and frames for electronic control units and/or mobile phones, IC chip and flash holder, electronic packaging, Thermal Interface Materials (TIM), electronic components in computers and consumer electrical appliances, mid-end receivers, solar cells and batteries such as processors, lamps, LED-lamps, electric motors, electric circuits, the encapsulation of electronics, such as coils or casings, solar cell back sheets, and battery casings.

Methods of Using Blended Thermoplastic Compositions

Articles formed from the blended thermoplastic compositions described herein may be used in one or more of the applications described above. In some aspects the article may be exposed to elevated temperatures for a sustained time, and the blended thermoplastic composition will have particular thermal conductivity and volume resistivity requirements so as to allow the article to maintain its performance while exposed to the sustained elevated temperature conditions. In some aspects the temperatures can be extreme and the time can be long. In particular aspects the article may be exposed to elevated temperatures of from about 40 degrees Celsius (° C.) to about 250° C., and for a sustained time of from about 24 hours to about 30 years. In certain aspects the article is used in an application requiring the blended thermoplastic composition to have a thermal conductivity of at least 0.6 watts per meter-Kelvin (W/mK) and a volume resistivity of at least $1*10^5$ Ohm-cm.

Accordingly, aspects of the disclosure relate to a method of using a blended thermoplastic composition in a high thermal conductivity and reduced electrical conductivity article comprising:

exposing an article comprising the blended thermoplastic composition according to any of the aspects described herein to an elevated temperature for a sustained time, wherein the article is used in an application requiring the blended thermoplastic composition to have a thermal conductivity of at least 0.6 watts per meter-Kelvin (W/mK) and a volume resistivity of at least $1*10^5$ Ohm-cm.

In particular aspects the elevated temperature comprises a temperature of from about 40 degrees Celsius (° C.) to about 250° C. and the sustained time comprises a time of from about 24 hours to about 30 years.

Without further elaboration, it is believed that one skilled in the art can, using the description herein, utilize the present disclosure. The following examples are included to provide addition guidance to those skilled in the art of practicing the claimed disclosure. The examples provided are merely representative of the work and contribute to the teaching of the present disclosure. Accordingly, these examples are not intended to limit the disclosure in any manner.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

Aspects

In various aspects, the present disclosure pertains to and includes at least the following aspects.

Aspect 1: A blended thermoplastic composition comprising, consisting of or consisting essentially of:

(a) from about 20 wt % to about 99 wt % of a thermoplastic polymer element;

(b) from about 1 wt % to about 60 wt % of a graphite-based filler element comprising at least about 0.01 wt % functional groups on a surface of the graphite-based filler element;

(c) from about 0.1 wt % to about 30 wt % of a functional agent element; and (d) from about 0 to about 50 wt % of a thermally conductive and electrically insulative filler, wherein the functional agent element comprises functional groups that interact with the functional groups on the surface of the graphite-based filler element, resulting in an increase of the volume resistivity of the blended thermoplastic composition that is at least $1*10^2$ greater than the volume resistivity of a substantially identical electrically conductive blended thermoplastic composition that does not include a functional agent element.

Aspect 2: The blended thermoplastic composition according to Aspect 1, wherein the thermoplastic polymer element comprises a polyolefin compound, a polyaryl sulfide compound, a polyamide compound, a polyester compound, a polycarbonate compound, a polyphenylene ether compound, a polyetherimide compound, copolymers comprising any of these compounds, blends comprising any of these compounds, and combinations thereof.

Aspect 3: The blended thermoplastic composition according to Aspect 1 or 2, wherein the functional groups on the surface of the graphite-based filler element comprise oxygen-based functional groups, nitrogen-based functional groups, or a combination thereof.

Aspect 4: The blended thermoplastic composition according to Aspect 3, wherein the graphite-based filler element is pre-treated to increase content of the oxygen-based functional groups or the nitrogen-based functional groups on the surface of the graphite-based filler element.

Aspect 5: The blended thermoplastic composition according to Aspect 3, wherein the oxygen-based functional groups comprise carboxylic acid functional groups.

Aspect 6: The blended thermoplastic composition according to Aspect 3, wherein the nitrogen-based functional groups comprise amine functional groups.

Aspect 7: The blended thermoplastic composition according to any of Aspects 3 to 6, wherein the graphite-based filler element is pre-treated by a plasma process to increase content of the oxygen-based functional groups or the nitrogen-based functional groups on the surface of the graphite-based filler element.

Aspect 8: The blended thermoplastic composition according to Aspect 7, wherein the plasma process is an ambient plasma process.

Aspect 9: The blended thermoplastic composition according to any of Aspects 3 to 6, wherein the graphite-based filler element is pre-treated by an oxidizing process to increase content of the oxygen-based functional groups or the nitrogen-based functional groups on the surface of the graphite-based filler element.

Aspect 10: The blended thermoplastic composition according to Aspect 9, wherein the graphite-based filler element is pre-treated by an oxidizing process with an acid element.

Aspect 11: The blended thermoplastic composition according to Aspect 10, wherein the acid element comprises nitric acid, chromic acid, potassium chlorate, sulfuric acid, or a combination thereof.

Aspect 12: The blended thermoplastic composition according to any of Aspects 1 to 11, wherein the functional agent element comprises a polymer element comprising an epoxy functional group, a maleic anhydride functional group, an amine functional group or a combination thereof.

Aspect 13: The blended thermoplastic composition according to any of Aspects 1 to 11, wherein the functional agent element comprises a non-polymer low molecular weight element comprising an epoxy, a maleic anhydride, an amine or a combination thereof.

Aspect 14: The blended thermoplastic composition according to any of Aspects 1 to 13, wherein the functional agent element interacts with the functional groups of the graphite-based filler element.

Aspect 15: The blended thermoplastic composition according to Aspect 14, wherein the interactions between the functional agent element and the functional groups of the graphite-based filler element comprise covalent bonds or non-covalent interactions.

Aspect 16: The blended thermoplastic composition according to any of Aspects 1 to 15, wherein the thermally conductive and electrically insulative filler comprises boron nitride, $Mg(OH)_2$, MgO, $CaCO_3$, silica, alumina, aluminum silicate, ZnO, ZnS, talc and combinations thereof.

Aspect 17: A method of using a blended thermoplastic composition in a high thermal conductivity and reduced electrical conductivity article comprising, consisting of or consisting essentially of:
exposing an article comprising the blended thermoplastic composition according to any of Aspects 1 to 16 to an elevated temperature for a sustained time,
wherein the article is used in an application requiring the blended thermoplastic composition to have a thermal conductivity of at least 0.6 watts per meter-Kelvin (W/mK) and a volume resistivity of at least $1*10^5$ Ohm-cm.

Aspect 18: The method according to Aspect 17, wherein the elevated temperature comprises a temperature of from about 40 degrees Celsius (° C.) to about 250° C. and the sustained time comprises a time of from about 24 hours to about 30 years.

Aspect 19: The method according to Aspect 17 or 18, wherein the application is a consumer electronics application, an LED lighting application or a power application.

Aspect 20: The method according to any of Aspects 17 to 19, wherein the article is a molded article.

Aspect 21: A blended thermoplastic composition comprising, consisting of or consisting essentially of:
(a) from about 20 wt % to about 99 wt % of a thermoplastic polymer element;
(b) from about 1 wt % to about 60 wt % of a pre-treated graphite-based filler element comprising at least about 0.01 wt % functional groups on a surface of the pre-treated graphite-based filler element;
(c) from about 0.1 wt % to about 30 wt % of a functional agent element; and
(d) from about 0 to about 50 wt % of a thermally conductive and electrically insulative filler,
wherein
the pre-treated graphite-based filler element is pre-treated to increase content of functional groups on the surface of the pre-treated graphite-based filler element, and
the functional agent element comprises a thermoplastic polymer that comprises functional groups that interact with the functional groups on the surface of the pre-treated graphite-based filler element, resulting in an increase of the volume resistivity of the blended thermoplastic composition that is at least $1*10^2$ greater than the volume resistivity of a substantially identical electrically conductive blended thermoplastic composition that does not include a pre-treated graphite-based filler element.

Aspect 22: The blended thermoplastic composition according to Aspect 21, wherein the functional groups of the functional agent element comprise amine groups, maleic anhydride groups, epoxide groups, hydroxyl groups, or a combination thereof.

Aspect 23: The blended thermoplastic composition according to Aspect 21 or 22, wherein the functional agent element comprises polyamide, ethylene-methylacrylate-glycidylacrylate copolymer, ethylene-glycidylmethylacrylate copolymer, poly(vinyl alcohol), polybutylene terephthalate, copolymers thereof, and combinations thereof.

Aspect 24: The blended thermoplastic composition according to any of Aspects 21 to 23, wherein the thermoplastic polymer element and the functional agent element comprise the same thermoplastic polymer.

Aspect 25: The blended thermoplastic composition according to any of Aspects 21 to 23, wherein the thermoplastic polymer element and the functional agent element comprise different thermoplastic polymers.

Aspect 26: The blended thermoplastic composition according to any of Aspects 21 to 25, wherein the functional groups on the surface of the pre-treated graphite-based filler element comprise oxygen-based functional groups, nitrogen-based functional groups, or a combination thereof.

Aspect 27: The blended thermoplastic composition according to Aspect 26, wherein the oxygen-based functional groups comprise carboxylic acid functional groups.

Aspect 28: The blended thermoplastic composition according to Aspect 26, wherein the nitrogen-based functional groups comprise amine functional groups.

Aspect 29: The blended thermoplastic composition according to any of Aspects 26 to 28, wherein the pre-treated graphite-based filler element is pre-treated by a plasma process to increase content of the oxygen-based functional groups or the nitrogen-based functional groups on the surface of the pre-treated graphite-based filler element.

Aspect 30: The blended thermoplastic composition according to Aspect 29, wherein the plasma process is an ambient plasma process.

Aspect 31: The blended thermoplastic composition according to any of Aspects 26 to 28, wherein the pre-treated graphite-based filler element is pre-treated by an oxidizing process to increase content of the oxygen-based functional groups or the nitrogen-based functional groups on the surface of the pre-treated graphite-based filler element.

Aspect 32: The blended thermoplastic composition according to Aspect 31, wherein the pre-treated graphite-based filler element is pre-treated by an oxidizing process with an acid element.

Aspect 33: The blended thermoplastic composition according to Aspect 32, wherein the acid element comprises nitric acid, chromic acid, potassium chlorate, sulfuric acid, or a combination thereof.

Aspect 34: The blended thermoplastic composition according to any of Aspects 21 to 33, wherein the functional agent element interacts with the functional groups of the pre-treated graphite-based filler element.

Aspect 35: The blended thermoplastic composition according to Aspect 34, wherein the interactions between the functional agent element and the functional groups of the pre-treated graphite-based filler element comprise covalent bonds or non-covalent interactions.

Aspect 36: The blended thermoplastic composition according to any of Aspects 21 to 35, wherein the thermally conductive and electrically insulative filler comprises boron nitride, $Mg(OH)_2$, MgO, $CaCO_3$, silica, alumina, aluminum silicate, ZnO, ZnS, talc and combinations thereof.

Aspect 37: The blended thermoplastic composition according to any of Aspects 21 to 36, wherein the thermoplastic polymer element comprises a polyolefin compound, a polyaryl sulfide compound, a polyamide compound, a polyester compound, a polycarbonate compound, a polyphenylene ether compound, a polyetherimide compound, copolymers comprising any of these compounds, blends comprising any of these compounds, and combinations thereof.

Aspect 38: A method of using a blended thermoplastic composition in a high thermal conductivity and reduced electrical conductivity article comprising, consisting of or consisting essentially of:
exposing an article comprising the blended thermoplastic composition according to any of Aspects 21 to 37 to an elevated temperature for a sustained time,
wherein the article is used in an application requiring the blended thermoplastic composition to have a thermal conductivity of at least 0.6 watts per meter-Kelvin (W/mK) and a volume resistivity of at least $1*10^5$ Ohm-cm.

Aspect 39: The method according to Aspect 38, wherein the elevated temperature comprises a temperature of from about 40 degrees Celsius (° C.) to about 250° C. and the sustained time comprises a time of from about 24 hours to about 30 years.

Aspect 40: The method according to Aspect 38 or 39, wherein the application is a consumer electronics application, an LED lighting application or a power application.

Aspect 41: The method according to any of Aspects 38 to 40, wherein the article is a molded article.

Aspect 42: The blended thermoplastic composition according to any of Aspects 3 to 6, wherein the graphite-based filler element is pre-treated by one or more of a plasma process, an oxidizing process, a high temperature air process, or an ozone process to increase content of the oxygen-based functional groups or the nitrogen-based functional groups on the surface of the pre-treated graphite-based filler element.

Aspect 43: The blended thermoplastic composition according to any of Aspects 26 to 28, wherein the pre-treated graphite-based filler element is pre-treated by one or more of a plasma process, an oxidizing process, a high temperature air process, or an ozone process to increase content of the oxygen-based functional groups or the nitrogen-based functional groups on the surface of the pre-treated graphite-based filler element.

EXAMPLES

The following examples are put forth so as to provide those of ordinary skill in the art with a complete disclosure and description of how the compounds, compositions, articles, devices, and/or methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by volume, temperature is in degrees Celsius (° C.) or is at ambient temperature, and pressure is at or near atmospheric. The thermal conductivity is measured by either ASTM E1461-07 using injection molded discs of 12.7 millimeter (mm) in diameter and 3 mm thickness or by ISO-22007-2 using discs of 25 mm diameter and 1.5 mm thickness unless indicated otherwise.

As used herein below the following are abbreviated as follows:

PP is polypropylene. HDPE is high density polyethylene. PA is polyamide. PEI is polyetherimide. PBT is polybutylene terephthalate.

$CaCO_3$ is calcium carbonate.

MAH is maleic anhydride.

TC is the thermal conductivity of the composition.

Example 1

PP-595A (polypropylene homopolymer powder, SABIC), Lotader AX8900 (ethylene-methylacrylate-glycidylacrylate copolymer, Arkema), and one of Imerys KS6, KS25, KS150 or C-Therm 001 were formulated into a composition in the proportions set forth below in Tables 1A, 1B, 1C and 1D (provided at FIGS. 1A-1D, respectively). KS6 is a relatively small graphite filler with a d90 of about 6 μm. KS25 is a small graphite filler with a d90 of about 27 μm. KS150 is a relatively large graphite filler with a d90 of about 150 μm. The C-Therm001 graphite filler is an extended graphite filler.

The PP-595A, Lotader AX8900 and filler were premixed and subsequently melt-compounded at 230° C. and 100 revolutions per minute (rpm) on a DSM Xplore™ MC15 twin-screw Micro Compounder system. The samples were mixed for 2 minutes (min) at constant speed (100 rpm). After 2 min, the recirculation is turned off and the material is directly unloaded into a heated (230° C.) and removable barrel with a plunger and injected into the temperature-controlled mold (60° C.) with the plunger powered by compressed air using a DSM Xplore™ IM 12 micro injection molder. For the KS6, KS25 and KS150 samples, discs (40 mm in diameter×3 mm thick) and ISO bars (80 mm length×10 mm width×4 mm height) were molded. For the C-Therm 001 samples, discs (40 mm in diameter×1.5 mm thick) and ASTM bars (64 mm length×12.7 mm width×3.2 mm height) were molded. The discs were used for determining the through-plane thermal conductivity and in-plane thermal conductivity. These properties were measured according to ISO 22007-2 using a Hotdisk TPS2500 apparatus. Bulk thermal conductivity was calculated form the through-plane and in-plane thermal conductivities as the square root of the product of the through-plane and in-plane thermal conductivities according to the following formula:

Bulk $TC=\sqrt{(TC\text{Through-plane} * TC\text{In-plane})}$

Volume resistivity was measured on either ASTM or ISO bars according to the procedure described herein in the "Definition" section. If the loading of the graphite-based materials was such that the electrical percolation threshold of the blended thermoplastic composition was passed, then the composition was electrically conductive. The results are set forth in Tables 1A-1D and the graphs at FIGS. 1E and 1F.

Tables 1A-1D show the through-plane, in-plane, and bulk thermal conductivities of polypropylene composites containing between about 10 vol % and about 30 vol % graphite filler and, in certain samples, about 10 wt % epoxy-based functional agent (Lotader AX8900). Specifically, the KS6 filler samples included either 10 vol %, 20 vol %, or 30 vol % and included about 10 wt % epoxy-based functional agent (Ex1.1, Ex1.2, Ex1.3), while the reference compositions did not include an epoxy-based functional agent (C1.1, C1.2, C1.3). The KS25 filler samples included either 10 vol %, 20 vol %, or 30 vol % and included about 10 wt % epoxy-based functional agent (Ex4.1, Ex5.1, Ex6.1), while the reference compositions did not include an epoxy-based functional agent (C4.1, C5.1, C6.1). The KS150 filler samples included either 10 vol %, 20 vol %, or 30 vol % and included about 10 wt % epoxy-based functional agent (Ex7.1, Ex8.1, Ex9.1), while the reference compositions did not include an epoxy-based functional agent (C7.1, C8.1, C9.1). The C-Therm001 graphite filler samples included either 10 vol %, 20 vol %, or 30 vol % graphite and included about 10 wt % epoxy-based functional agent (Ex10.1, Ex11.1, Ex12.1), while the reference compositions did not include an epoxy-based functional agent (C10.1, C11.1, C12.1).

Results from Tables 1A-1D show that the addition of the epoxy-based functional agent Lotader AX8900 to a polypropylene composition including non-plasma treated graphite filler increased the volume resistivity and thus, reduced electrical conductivity, without significantly affecting the thermal conductivity of the composition.

Figure 1F:
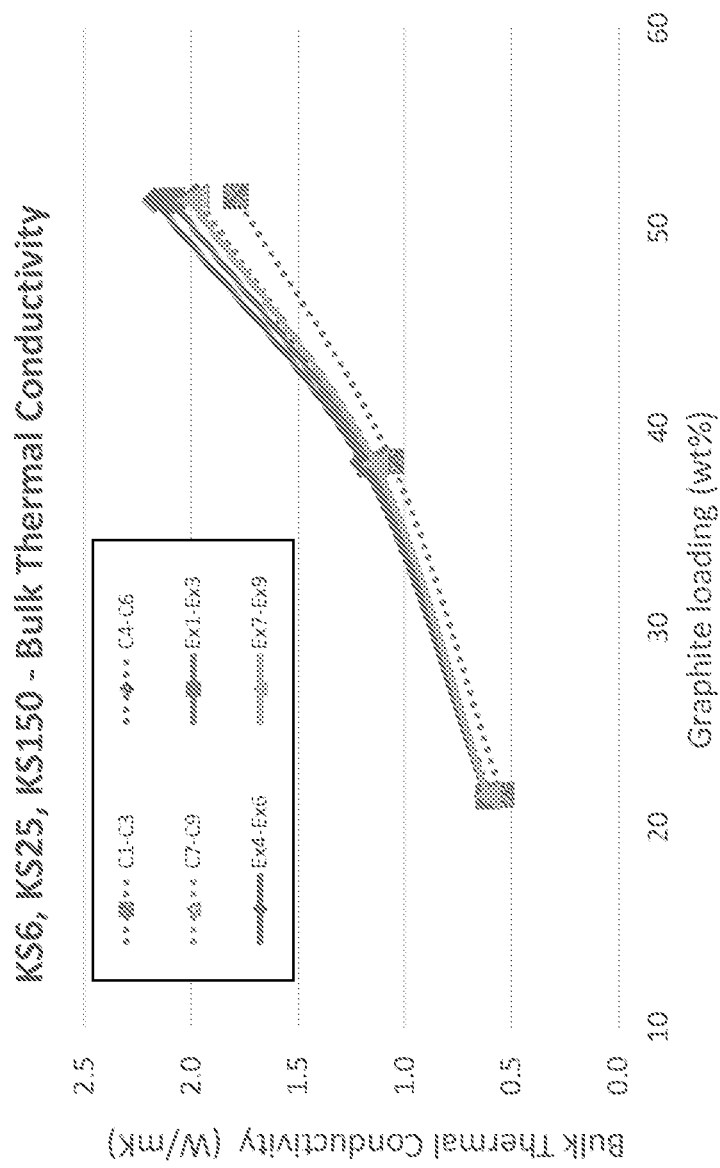

FIG. 1E clearly emphasizes the overall increase in volume resistivity in presence of the Lotader AX8900 functional agent, which varies as a function of the graphite particle size. The binding effect of the functional agent shows higher efficiency with the small particles. Nevertheless, significant increase in volume resistivity are achieved for all three graphite grades. FIG. 1F shows that the thermal conductivity properties are not substantially affected.

With respect to the larger sized graphite platelets of C-Therm001, Table 1D shows an overall increase in volume resistivity, but to a lesser extent when compared to the smaller graphite platelets of KS6. Nevertheless, these results demonstrate that the functional agent, in this case Lotader AX8900, may bind to graphite fillers and contributes to the overall increase in volume resistivity without causing a substantial change in thermal conductivity.

In a hypothetical/prophetic example, the composition of Ex9.1 (30 vol % of KS150 in PP plus Lotader) includes pretreated graphite to increase the content of functional groups on the surface of the particles. The pretreatment can be based on a plasma or oxidizing acid method, but is not limited to these pretreatment methods. The blended thermoplastic composition is expected to exhibit an increase in volume resistivity of at least $1*10^2$ compared to the substantially identical electrically conductive blended thermoplastic composition that does not include a functional agent element. In addition, the composition would not have any significant variation of its bulk thermal conductivity.

Example 2

VP-417 and VP-418 are plasma treated Mechanolube 1 graphite materials supplied by HC Carbon. VP417 was plasma treated using low-pressure plasma. Specifically, the Mechanolube 1 was subjected to radio frequency induction coupled with low-pressure Argon plasma. VP418 was plasma treated using a harsher technique compared to the treatment of the VP417 graphite. Specifically, to obtain the VP418 material, the Mechanolube 1 graphite was subjected to electrodeless atmospheric microwave plasma using Argon as a quenching gas. XPS measurements were carried out using a Quantera from ULVAC-PHI. Both the VP417 and VP418 graphite compounds contain oxygen functional groups. VP417 includes about 98.45 atomic % C1s and about 1.55 atomic % O1s. The high-resolution C1s spectrum exhibits C—O functionalities similar to hydroxyls, aldehydes and carbonyls. VP418 includes about 97.35 wt C1s and about 2.65 wt % $O_{1S}$. The high-resolution C1s spectrum shows carboxylic acid groups next to hydroxyl, aldehyde and carbonyl groups.

Figure 2C:
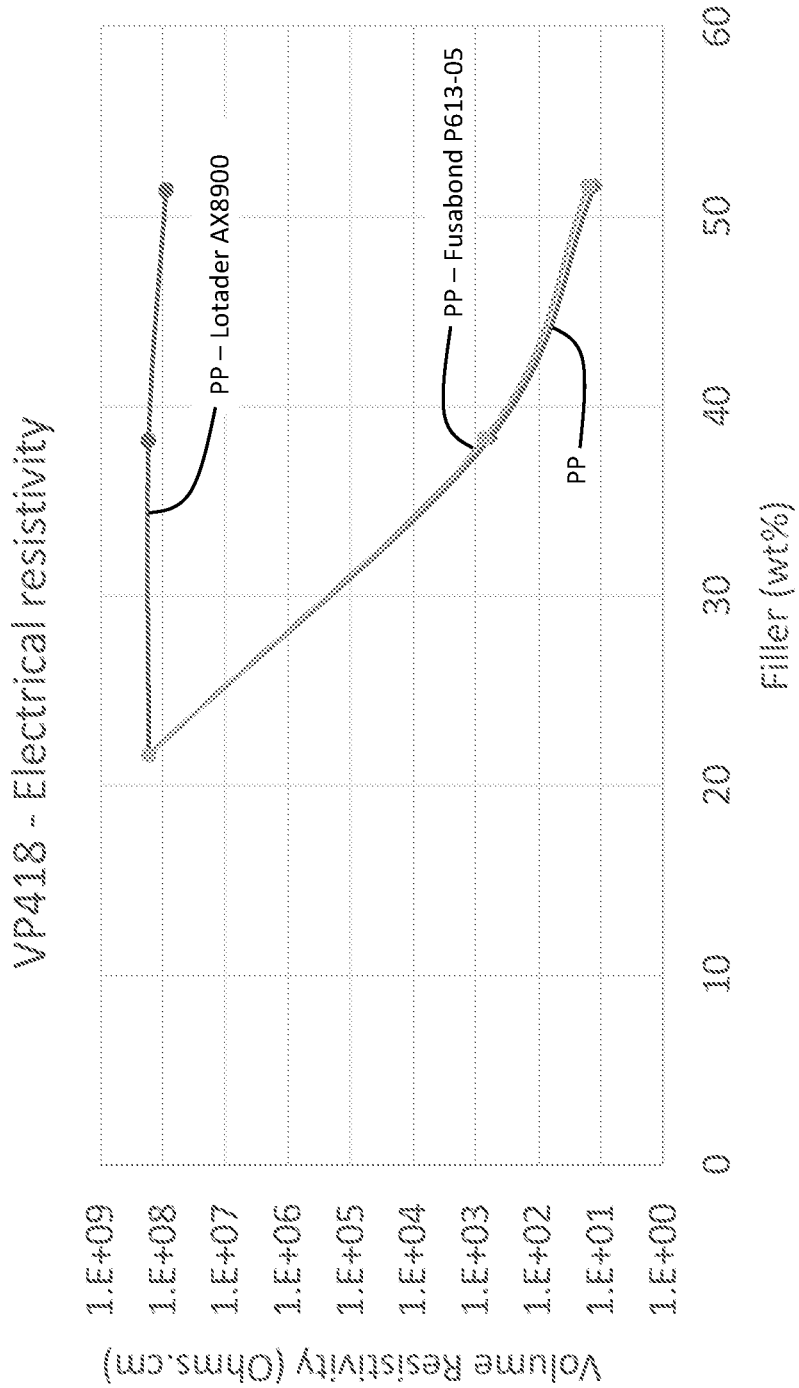
FIGS. 2C, 2D, 2E and 2F are graphs showing data for volume resistivity or thermal conductivity versus filler loading for compositions shown in FIGS. 2A and 2B.
Figure 2D:
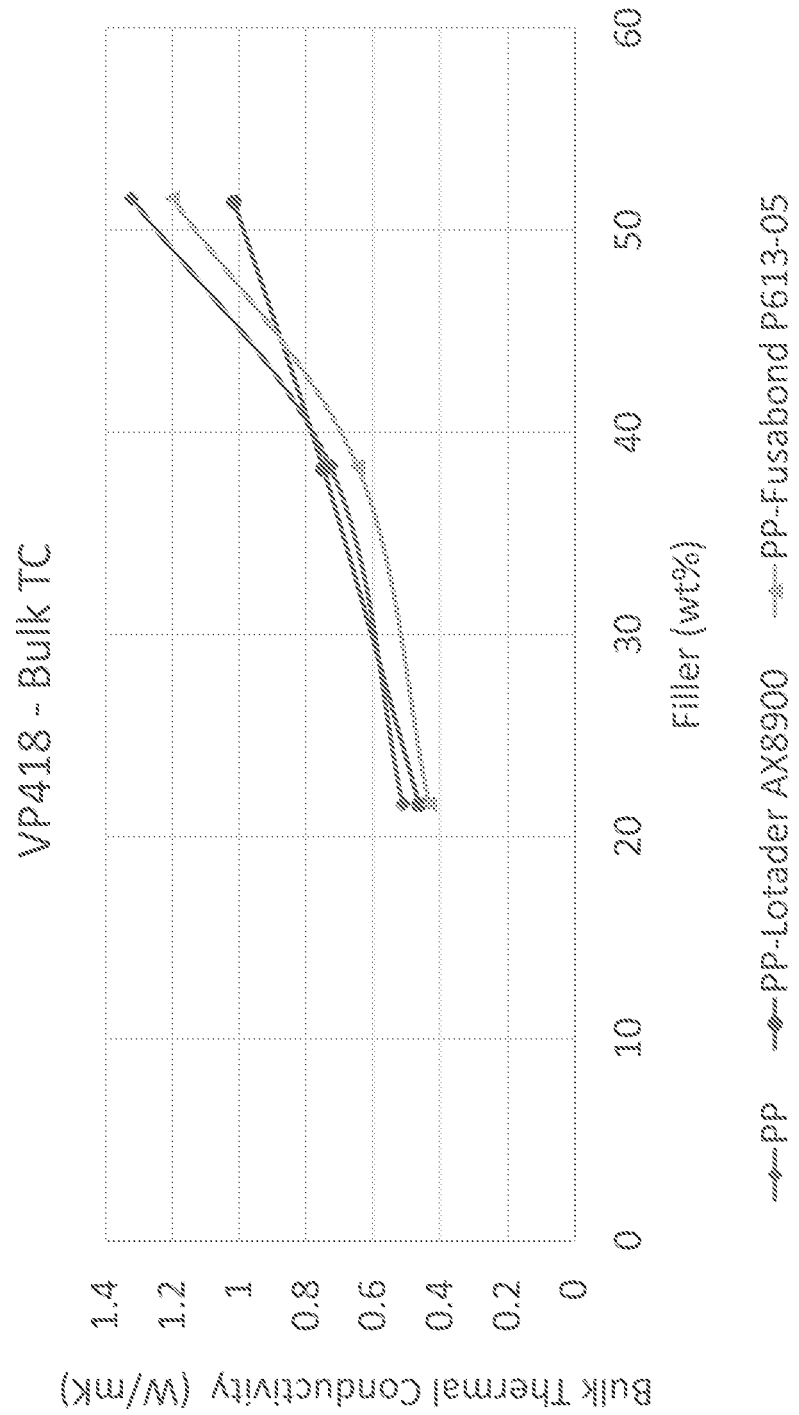
Figure 2E:
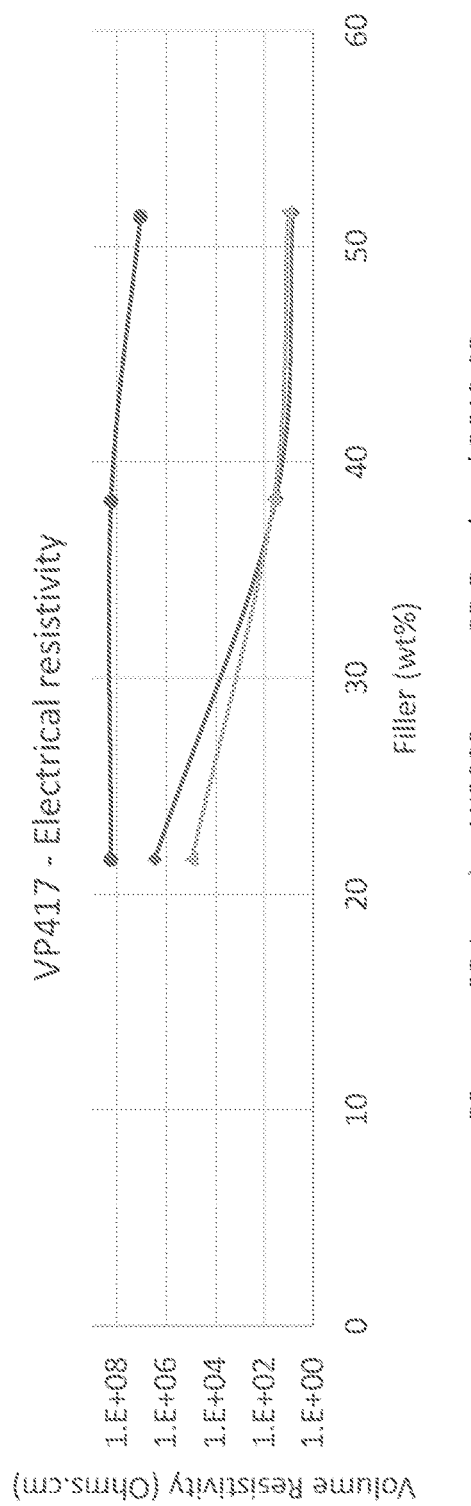
Figure 2F:
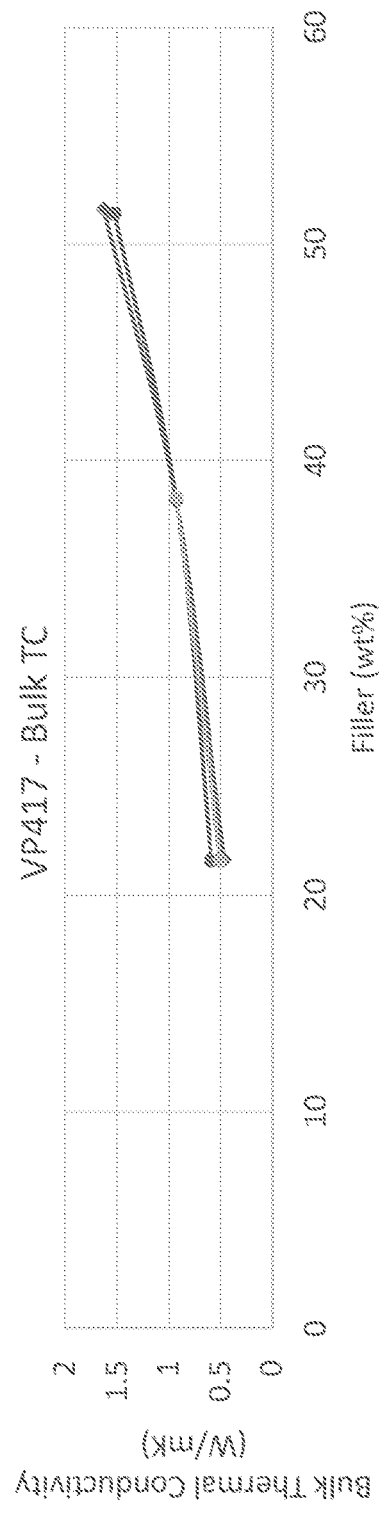

Blended thermoplastic compositions including PP-595A (polypropylene homopolymer powder, SABIC), either 10 wt % epoxy-containing functional agent Lotader AX8900 or 10 wt % maleic anhydride (MAH) containing functional agent Fusabond P613-5, and either VP417 or VP418, were formulated into a composition in the proportions set forth in Tables 2A and 2B (provided at FIGS. 2A and 2B, respectively).

The samples were premixed and subsequently melt-compounded and injection molded using the same equipment and procedures as described in Example 1. The through-plane thermal conductivity and in-plane thermal conductivity was measured on discs (40 mm in diameter×1.5 mm thick) according to ISO22007-2 using a Hotdisk TPS2500 apparatus. Bulk thermal conductivity was calculated according to the calculation discussed above, and volume resistivity was measured on the ASTM bars (64 mm length×12.7 mm width×3.2 mm height) according to the procedure discussed above.

Tables 2A and 2B and the graphs at FIGS. 2C-2F show the thermal conductivities and volume resistivities of the plasma-treated graphite composite samples. Specifically, the VP417 and VP 418 containing samples were loaded with either 0 wt % functional agent, 10 wt % epoxy-based functional agent (Lotader AX8900), or 10 wt % MAH functional agent (Fusabond P613-05). It is evident from FIG. 2E and Tables 2A and 2B that there is already some electrical conductivity at about 20 wt % VP417 in straight PP and that further increasing the wt % loading of VP417 decreases the volume resistivity (increases the electrical conductivity) significantly.

This indicates that at about 20 wt % VP417 the percolation threshold for the composition has already been passed. For VP418 at about 20 wt % the VP418/PP composition is still electrically insulative (overload multimeter), but at about 40 wt % there is a noticeable electrical conductivity (Tables 2A and 2B, FIG. 2C). This indicates that for VP418 the percolation threshold is just above filler loading of 10 vol %. Samples from Tables 2A and 2B and FIGS. 2C-2F show that above the percolation threshold, the addition of the epoxy-based functional agent Lotader AX8900 to each of the plasma-treated VP 417 and VP 418 compositions increased the volume resistivity and thus, reduced the electrical conductivity, without significantly affecting the thermal conductivity of either composition. At a graphite loading of about 40 wt % or higher, the increase in resistivity is about a factor $10^5$ or higher for the blends containing the epoxy-based functional agent Lotader AX8900 compared to the substantially identical blends without the LotaderAX8900 functional agent.

Example 3

PP-400 GA05 (polypropylene powder), Lotader AX8900 (ethylene-methylacrylate-glycidylacrylate copolymer, an epoxy-based functional agent), Mechanolube 4G® (graphite, HC Carbon) and Millicarb® (ground $CaCO_3$, Omya) were formulated into a composition. The graphite filler used in this example, Mechanolube 4G®, is an acid-modified graphite functionalized with carboxylic acid groups. It has a d90 of about 8 µm to about 11 µm. The overall composition was formulated in the proportions set forth in Table 3, provided at FIG. 3.

The polypropylene and Lotader AX8900 were fed at the throat, and the Mechanolube 4G® and the Millicarb® were fed downstream at barrel 4 and 6, respectively. The compounding was performed on a ZSK 25P8,2 from Coperion Werner & Pfleiderer using the following temperature settings (Zone 1: not adjustable, Zone 2: 100° C., Zone 3: 150° C., Zone 4-10: 210° C., Die:210° C.). After pre-drying at 80° C. for 2 hours, the compositions were injection molded on a BATTENFELD BA 600/200 CDC 60 ton machine with the following settings (Zone 1: 190° C., Zone 2: 230° C., Zone 3: 240° C., Nozzle: 235° C., Mold: 50° C.). The through-plane thermal conductivity was measured on injection molded pin-point gated discs (12.7 mm in dimeter, 3 mm thick) using a Netzsch NanoFlash FLA447 instrument, according to ASTM E1461-07. Volume resistivity was measured on the central portion of ISO 527 tensile bars according to the procedure described above. The results are set forth in Table 3.

Table 3 shows the tensile, impact, thermal, electrical, and physical properties of polypropylene-based thermally conductive and graphite-based composites containing 20 vol % graphite and a total filler content of 30 vol %. As shown, the sample composition in this example utilizing an epoxy-based functional agent Lotader AX8900 contained about 41.9 wt % PP Co-polymer, about 5 wt % functional agent, about 33.2 wt % graphite (Mechanolube 4G®), and about 19.9 wt % calcium carbonate (Millicarb®).

The results show that the composition utilizing a PP Co-polymer-based graphite without the functional agent had an electrical resistivity of about $1.6*10^2$ Ohm-cm and was thus electrically conducting, indicating that the graphite content was sufficient for the composition to be above the electrical percolation threshold. In addition, Table 3 demonstrates that the addition of an epoxy-based functional agent such as Lotader AX8900 to a PP co-polymer-based graphite composition increased overall volume resistivity of the composition and consequently reduced overall electrical conductivity relative to a reference composition that did not include a functional agent. Thus, these results show that a graphite-based thermally conductive PP co-polymer composition demonstrated reduced electrical conductivity with the addition of an epoxy-based functional agent such as Lotader AX8900, without significantly affecting the thermal conductivity of either composition.

Example 4

HDPE (Hostalen GC-7260, Basell), maleic anhydride functional agent Fusabond E-265 (maleic anhydride-modified polyethylene, DuPont), epoxy-based functional agent Entirabond 12 (ethylene, glycidylmethylacrylate copolymer, DuPont), Millicarb/HDPE MB (65.2/34.8 wt %/wt %) lab-made) master batch, and Mechanolube 4G (graphite composition) were formulated in a composition. As described above, the graphite filler used in this example, Mechanolube 4G®, is an acid-modified graphite functionalized with carboxylic acid groups. It has a d90 of about 8 µm to about 11 µm. The overall composition was formulated in the proportions set forth in Table 4, provided at FIG. 4.

The HDPE, either of the maleic anhydride or epoxy-based functional agents, was fed at the throat, whereas the Millicarb®/HDPE masterbatch and Mechanolube 4G® were fed downstream at barrel 4 and 6, respectively. The compounding was performed on a ZSK 25P8,2 from Coperion Werner & Pfleiderer using the following temperature settings (Zone 1: not adjustable, Zone 2: 100° C., Zone 3: 150° C., Zones 4-10: 190° C., Die: 190° C.). The Millicarb/HDPE masterbatch was made on the same compounding line under the same settings by feeding the HDPE at the throat and split-feeding the Millicarb ($CaCO_3$, Omya) downstream at barrels 4 and 6 respectively. After pre-drying at 80° C. for 4 hours, the compositions were injection molded on a BATTENFELD BA 600/200 CDC 60 ton machine with the following settings (Zone 1: 225° C. , Zone 2: 235° C., Zone 3: 245° C., Nozzle: 240° C., Mold: 60° C.). The through-plane thermal conductivity was measured on injection molded pin-point gated discs (12.7 mm diameter, 3 mm thickness) using a Netzsch NanoFlash FLA447 instrument according to ASTM E1461-07. Volume resistivity was measured on the central portion of ISO 527 tensile bars according to the procedure described above. The results are set forth in Table 4.

Table 4 shows the tensile, impact, thermal, electrical, and physical properties of polyethylene-based thermally conductive and graphite-based composites containing about 15.7 wt % Mechanolube 4G® graphite, about 65 wt % Millicarb®, with about 10 wt % of either the maleic anhydride-based Fusabond E-265 or epoxy-based Entirabond 12 functional agent, and about 17.1 wt % HDPE. Notably, the sample without a functional agent included about 27.1 wt % HDPE.

The results show that a composite utilizing a HDPE-based composition with no functional agent shows an electrical resistivity of about $3.36*10^5$ Ohm-cm, indicating that the resulting composition is electrically conductive and that the concentration of the Mechanolube 4G is sufficient for the composition to be above the electrical percolation threshold. In addition, the results show an unexpected and significant increase in volume resistivity for samples utilizing an HDPE-based composition with either a maleic anhydride-based functional agent (Fusabond E-265) or an epoxy-based functional agent (Entirabond 12) in combination with a graphite-based filler element (Mechanolube 4G®) as compared to a similar composition without any type of functional agent. Thus, these results show that graphite-based thermally conductive HDPE compositions demonstrate increased volume resistivity and thus, reduced electrical conductivity with the addition of a functional agent such as a maleic anhydride-based Fusabond E-265 or the epoxy-based Entirabond 12.

Example 5

For Example 5, Polypropylene/graphite KS6 (30 vol %) compositions having an increasing content of functional agent (Lotader AX8900) ranging from 1 to 20 wt %, were prepared in the same manner as set forth above in Example 1 with discs (40 mm in diameter×3 mm thick) and ISO bars (80 mm length×10 mm width×4 mm height). The samples prepared and the properties of the compositions are shown in Table 5, provided at FIG. 5. From the results, it can be seen that as the content of functional agent is increased, volume resistivity increases without any detrimental effect on thermal conductivity. It is also seen that as the content of functional agent is increased above 10 wt %, the additional benefit becomes minor. Reasons for this could include that the additional reactive groups cannot contact and/or interact with the surface of the graphite particles or that the functional agent becomes in excess (all the functional groups at the surface of the graphite have reacted).

Example 6

For Example 6, compositions having different types of thermoplastic polymer and a different functional agent (1 wt % Joncryl ADR 4368C) were prepared in the same manner as set forth above in Example 1 with discs (40 mm in diameter×3 mm thick) and ISO bars (80 mm length×10 mm width×4 mm height). The polyamide 6 (PA6) was Radipol® S24, available from RadiciGroup. The polybutylene terephthalate (PBT) was PBT195 (195 HPGR −1001), available from SABIC. The extrusion temperatures were 230° C. for PP, 270° C. for PA6 and 270° C. for PBT. Joncryl ADR 4368C is a modified styrene acrylic polymeric functional agent from BASF that contains glycidyl methacrylate (GMA). The samples prepared and the properties of the compositions are shown in Tables 6A, 6B and 6C, provided at FIGS. 6A, 6B and 6C, respectively.

From the results in Table 6A (PP), a substantial increase in volume resistivity (greater than 1*10²) was observed at up to 20 vol % graphite loading without a substantial change in bulk thermal conductivity. From the results in Table 6B (PA6), there was no significant increase in volume resistivity; it is believed that this was due to fact that the GMA groups react mainly with the end groups of PA6. From the results in Table 6C (PBT), a substantial increase in volume resistivity at up to 20 vol % graphite loading was observed with only minimal losses in thermal conductivity.

In a hypothetical/prophetic example, the compositions of Samples Ex4.6, Ex5.6 and Ex6.6 (10, 20 and 30 vol % of KS6 in PA6 plus 1 wt % Joncryl) are prepared in which the graphite is premixed with the Joncryl functional agent to enable interactions between the two components. Then, in a second step, this premixture is compounded with the PA6. The blended thermoplastic composition would be expected to exhibit an increase in volume resistivity of at least 1*10² compared to the substantially identical electrically conductive blended thermoplastic composition that does not include a functional agent element. In addition, the composition would not be expected to have any significant variation in bulk thermal conductivity.

Example 7

For Example 7, compositions including polyetherimide (PEI), a functional agent (Lotader AX8900) and various graphite loadings were prepared in the same manner as set forth above in Example 1 with discs (40 mm in diameter×3 mm thick) and ISO bars (80 mm length×10 mm width×4 mm height). The PEI was ULTEM™ 1010, available from SABIC. Of note, the extrusion temperature for the samples was 360-380° C. and the injection molding temperature was 120° C., in contrast to Example 1, which utilized extrusion temperatures of 230° C. and injection molding temperatures of 60° C. The samples prepared and the properties of the compositions are shown in Table 7, provided at FIG. 7.

From the results in Table 7, a substantial increase of from about 10× to 100× in volume resistivity was observed at up to 20 vol % graphite loading without substantial changes in bulk thermal conductivity. The increase in volume resistivity was more limited than for the polypropylene systems (see, e.g., Example 1); this could be explained by the higher extrusion temperature, resulting in partial degradation of the functional agent (Lotader AX8900) compound.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed is:

1. A blended thermoplastic composition comprising:
   (a) from about 20 wt % to about 99 wt % of a thermoplastic polymer element;
   (b) from about 1 wt % to about 60 wt % of a graphite-based filler element comprising at least about 0.01 wt % functional groups on a surface of the graphite-based filler element;
   (c) from about 0.1 wt % to about 30 wt % of a functional agent element; and
   (d) from about 0 to about 50 wt % of a thermally conductive and electrically insulative filler,
   wherein the functional agent element comprises functional groups that interact with the functional groups on the surface of the graphite-based filler element.

2. The blended thermoplastic composition according to claim 1, wherein the functional groups on the surface of the graphite-based filler element comprise oxygen-based functional groups, nitrogen-based functional groups, or a combination thereof.

3. The blended thermoplastic composition according to claim 2, wherein the graphite-based filler element is pre-treated to increase content of the oxygen-based functional groups or the nitrogen-based functional groups on the surface of the graphite-based filler element.

4. The blended thermoplastic composition according to claim 3, wherein the graphite-based filler element is pre-treated by one or more of a plasma process, an oxidizing process, a high temperature air process, or an ozone process to increase content of the oxygen-based functional groups or the nitrogen-based functional groups on the surface of the graphite-based filler element.

5. The blended thermoplastic composition according to claim 1, wherein the functional agent element comprises a polymer element comprising an epoxy functional group, a maleic anhydride functional group, an amine functional group or a combination thereof.

6. The blended thermoplastic composition according to claim 1, wherein the functional agent element comprises functional groups including maleic anhydride (MAH), epoxy or amine groups.

7. A blended thermoplastic composition comprising:
(a) from about 20 wt % to about 99 wt % of a thermoplastic polymer element;
(b) from about 1 wt % to about 60 wt % of a pre-treated graphite-based filler element comprising at least about 0.01 wt % functional groups on a surface of the pre-treated graphite-based filler element;
(c) from about 0.1 wt % to about 30 wt % of a functional agent element; and
(d) from about 0 to about 50 wt % of a thermally conductive and electrically insulative filler,
wherein
the pre-treated graphite-based filler element is pre-treated to increase content of functional groups on the surface of the pre-treated graphite-based filler element, and
the functional agent element comprises a thermoplastic polymer that comprises functional groups that interact with the functional groups on the surface of the pre-treated graphite-based filler element, resulting in an increase of the volume resistivity of the blended thermoplastic composition that is at least $1*10^2$ greater than the volume resistivity of a substantially identical electrically conductive blended thermoplastic composition that does not include a pre-treated graphite-based filler element.

8. The blended thermoplastic composition according to claim 7, wherein the functional groups of the functional agent element comprise amine groups, maleic anhydride groups, epoxide groups, hydroxyl groups, or a combination thereof.

9. The blended thermoplastic composition according to claim 7, wherein the functional agent element comprises polyamide, ethylene-methylacrylate-glycidylacrylate copolymer, ethylene-glycidylmethylacrylate copolymer, poly(vinyl alcohol), polybutylene terephthalate, copolymers thereof, and combinations thereof.

10. The blended thermoplastic composition according to claim 7, wherein the thermoplastic polymer element and the functional agent element comprise the same thermoplastic polymer.

11. The blended thermoplastic composition according to claim 7, wherein the thermoplastic polymer element and the functional agent element comprise different thermoplastic polymers.

12. The blended thermoplastic composition according to claim 7, wherein the functional groups on the surface of the pre-treated graphite-based filler element comprise oxygen-based functional groups, nitrogen-based functional groups, or a combination thereof.

13. The blended thermoplastic composition according to claim 12, wherein the pre-treated graphite-based filler element is pre-treated by one or more of a plasma process, an oxidizing process, a high temperature air process, or an ozone process to increase content of the oxygen-based functional groups or the nitrogen-based functional groups on the surface of the pre-treated graphite-based filler element.

14. The blended thermoplastic composition according to claim 1, wherein the thermally conductive and electrically insulative filler comprises boron nitride, $Mg(OH)_2$, MgO, $CaCO_3$, silica, alumina, aluminum silicate, ZnO, ZnS, talc and combinations thereof.

15. The blended thermoplastic composition according to claim 1, wherein the thermoplastic polymer element comprises a polyolefin compound, a polyaryl sulfide compound, a polyamide compound, a polyester compound, a polycarbonate compound, a polyphenylene ether compound, a polyetherimide compound, copolymers comprising any of these compounds, blends comprising any of these compounds, and combinations thereof.

16. The blended thermoplastic composition according to claim 1, wherein the interactions comprise covalent bonds or non-covalent interactions.

17. A method of using a blended thermoplastic composition in a high thermal conductivity and reduced electrical conductivity article comprising:
exposing an article comprising the blended thermoplastic composition according to claim 1 to an elevated temperature for a sustained time,
wherein the article is used in an application requiring the blended thermoplastic composition to have a thermal conductivity of at least 0.6 watts per meter-Kelvin (W/mK) and a volume resistivity of at least $1*10^5$ Ohm-cm.

18. The method according to claim 17, wherein the elevated temperature comprises a temperature of from about 40 degrees Celsius (° C.) to about 250° C. and the sustained time comprises a time of from about 24 hours to about 30 years.

19. The method according to claim 17, wherein the application is a consumer electronics application, an LED lighting application or a power application.

20. The method according to claim 17, wherein the article is a molded article.

* * * * *